United States Patent
Summers et al.

(10) Patent No.: US 6,402,030 B1
(45) Date of Patent: Jun. 11, 2002

(54) METHOD AND SYSTEM FOR PROCESSING CAR WASH VOUCHERS

(75) Inventors: Steven E. Summers, Uniontown; Rondall P. James, Jr., Louisville, both of OH (US)

(73) Assignee: DRB Systems, Incorporated, Akron, OH (US)

( * ) Notice: Subject to any disclaimer, the term of this patent is extended or adjusted under 35 U.S.C. 154(b) by 3 days.

(21) Appl. No.: 09/694,695

(22) Filed: Oct. 23, 2000

(51) Int. Cl.[7] .................................................. G06F 7/08

(52) U.S. Cl. ...................................... 235/381; 235/375

(58) Field of Search .............................. 235/381, 375; 705/413

(56) References Cited

U.S. PATENT DOCUMENTS

| | | | |
|---|---|---|---|
| 4,527,578 A | 7/1985 | Klein et al. | |
| 4,589,069 A | 5/1986 | Endo et al. | |
| RE32,601 E | 2/1988 | Klein et al. | |
| 4,893,229 A | 1/1990 | Detrick | |
| 4,998,547 A | 3/1991 | Klein | |
| RE33,849 E | 3/1992 | Detrick | |
| 6,116,505 A | * 9/2000 | Withrow | ..................... 235/381 |

FOREIGN PATENT DOCUMENTS

WO  9642061  * 12/1996

OTHER PUBLICATIONS

Hasegawa, et al., "Submicron Pattern Dimension Determination a Using Total Waveform Comparison Method," J. Vac. Sci Technol. B 6 (3) May/Jun. 1988.

* cited by examiner

Primary Examiner—Harold I. Pitts
(74) Attorney, Agent, or Firm—Eschweiler & Associates, LLC

(57) ABSTRACT

A system and methodology are provided for providing car wash services according to a voucher code. The system obtains the voucher code from a voucher and determines whether the voucher code is expired or has been previously used. Based on the validity determination, car wash services are selectively provided according to desired wash service information obtained from the voucher code, as well as additional or upgraded services desired by a car wash customer at the time the voucher is presented. The system determines the validity of a voucher code by accessing a network or chain management system which maintains a database of voucher code usage information, thus allowing a determination at any site in the network or chain of whether the voucher has expired or has been previously used. The system further provides the capability of obtaining voucher code usage reports from any site in the chain.

33 Claims, 19 Drawing Sheets

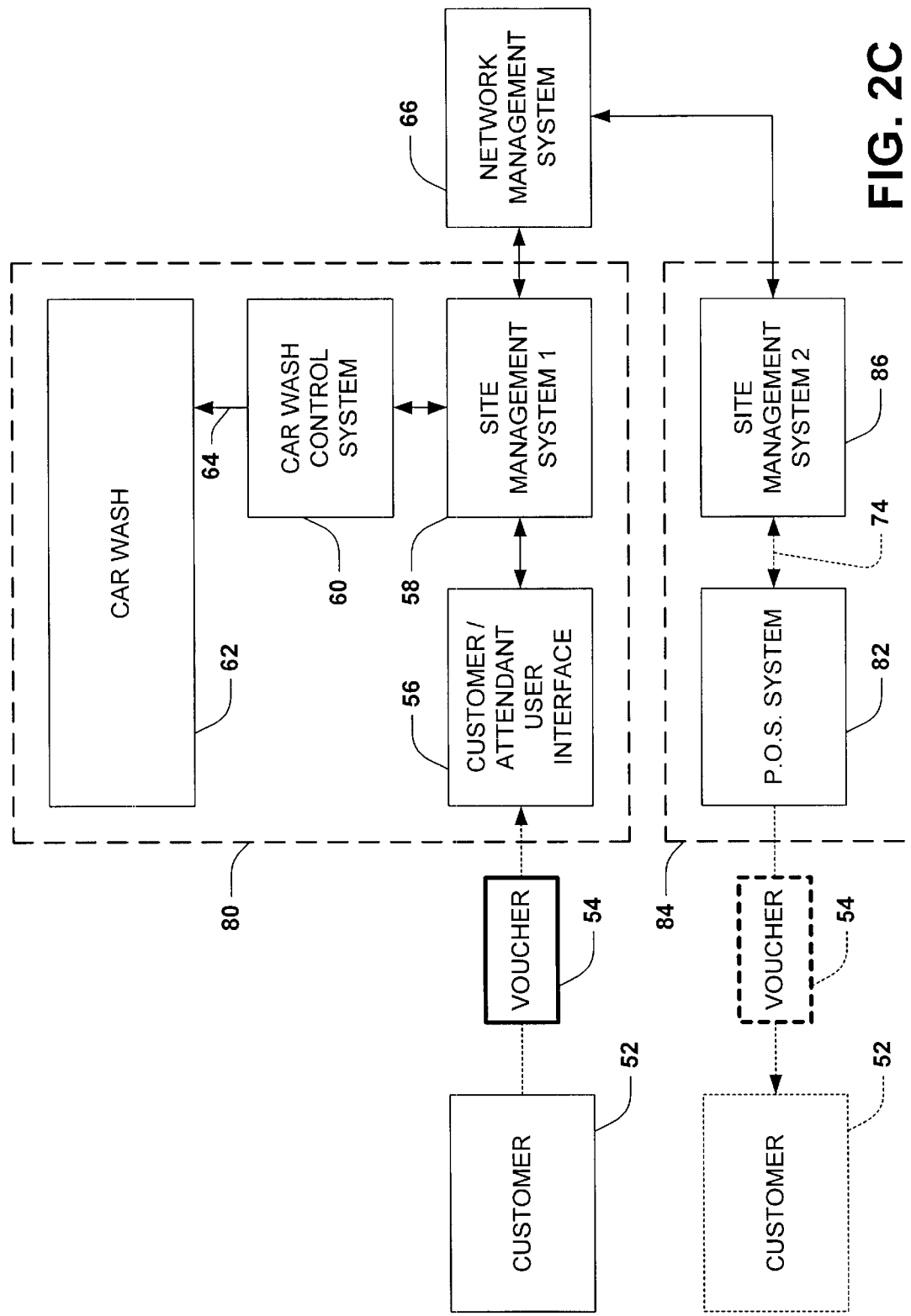

| T | E | E | E | S | S | S | M | M | D | D | Y | Y | Q | Q | Q | Q | X |

| 1 | 0 | 0 | 0 | 1 | 0 | 1 | 1 | 0 | 1 | 9 | 9 | 0 | 0 | 0 | 0 | 3 |

METHOD AND SYSTEM FOR PROCESSING CAR WASH VOUCHERS

The present invention relates generally to automated vehicle wash systems. More particularly, the invention relates to a system and methodology for processing car wash vouchers.

BACKGROUND OF THE INVENTION

In the vehicle care industry, car wash tunnels provide a variety of automated car wash services at both stand alone car wash sites and at gas stations. A customer may select from basic wash services, waxing options, under carriage wash options, and the like, and the services are provided through automated brushes, sprayers, pumps, conveyors, and dryers in the car wash tunnel. The various washing, waxing, and drying apparatus in the tunnel are typically actuated by a control system providing control signals to implement the desired wash services.

At many full service car washes, one or more attendants greet the customer at the tunnel entrance. The customer informs an attendant of the wash services desired, who then obtains payment from the customer, and inputs a list of wash services into the control system. The attendant may drive the vehicle to the entrance of the tunnel where a conveyor moves the vehicle through the tunnel. Optional vacuuming services may be provided by an attendant prior to the vehicle entering the tunnel. As the customer vehicle travels through the car wash tunnel, the control system actuates the necessary washing devices at appropriate times in accordance with the list of services entered by the attendant. Windows may be provided in the side of the wash tunnel whereby the customer may view the washing process. An attendant typically enters the vehicle at the exit end of the tunnel conveyor, and drives a short distance out of the tunnel whereupon final drying and/or other detailing services may be performed manually. The waiting customer thereafter drives away in a cleaned vehicle.

Many gas stations provide car washes along with fuel sales, food and beverage sales, and other services. A car wash tunnel is provided on the premises, which is typically a low cost car wash offering few or no optional wash services. At many such multi-service sites, a customer may purchase a car wash in association with fuel or other purchases, which are paid for in a single commercial transaction. Typically, the customer receives a receipt from a station attendant which includes a numeric or alphanumeric code. A keypad or other character entry device is positioned near the car wash tunnel entrance, with which the customer enters the code to obtain entrance to the car wash. The provision of the code allows the customer to purchase a car wash which may be used contemporaneously with the purchase, or at a later time.

In some situations, one or more optional wash services may be available at such a car wash. A customer desiring such services may pay an upgraded car wash fee when making the initial purchase. The code provided to the user may contain information used by the automated car wash control system to provide these optional services upon entry of the code at the tunnel entrance. Thus, the control system for the car wash tunnel may provide different control signals to the actuating devices therein depending on the code provided by a customer. The code provides customers with a variety of car wash service choices without requiring an attendant at the tunnel entrance to program a list of services into a control system. Consequently, many gas stations include unattended car wash tunnels on the premises, offering a certain number of car wash choices at a minimal cost to the customer.

In today's multi-service gas stations, sophisticated point-of-sale (POS) systems include one or more cash registers, credit card readers, character displays, fuel pump control interfaces, and the like. Such systems allow station attendants to interact with the various systems (e.g., fuel pumps) associated with the station, and to efficiently accept payment for fuel and other goods sold in the station. Conventional car wash entrance codes are provided to the customer on a printed receipt, such as a cash register receipt. A POS system may provide the car wash code according to a pre-defined protocol to include the desired optional car wash services purchased by a customer, such that entry of the code into the car wash control system keypad interface results in the correct tunnel operation.

Although such car wash code numbers reduce or eliminate the attendant interaction with the system, the use of a pre-defined coding protocol allows unscrupulous persons to construct tunnel access codes with which car washes may be obtained without payment. In addition to constructing car wash codes from a protocol, unpaid for washes may be possible through reuse of a code that was legitimately issued by a POS system. Moreover, conventional systems do not provide for tracking of car wash code utilization, attempted reuse of codes, and/or the attempted usage of invalid codes in a multi-site carwash chain or system. It is therefore desirable to provide a system which prevents the provision of automated car wash services where such services have not been properly paid for.

In many gas station chains, car wash services may be provided at many different sites in a chain or network. Customers purchasing a car wash at one site in a chain may wish to obtain the car wash at a later date. However, it may be desirable to sell car washes where the wash services are available only for a certain time period. In addition, conventional automated car wash systems do not allow a customer to purchase a car wash at one site in the chain and to obtain the car wash services at another site.

SUMMARY OF THE INVENTION

The present invention provides a system and methodology by which the above mentioned problems and shortcomings are minimized or overcome. The invention provides a system and methodology for processing a car wash voucher code in a multi-site car wash system. The system obtains the voucher code from a voucher and determines whether the voucher code is expired or has been previously used. For example, a voucher code may be expired a certain time period (e.g., 30 days) after sale. The voucher may be created by a POS which need not be electrically connected with the site management system. The system maintains a network management database accessible by site management servers located at individual sites in the chain, which includes information related to usage and validity of voucher codes. Individual site management servers or systems may access the database information periodically or upon presentation of a voucher code at a car wash site, in order to determine whether the code is valid. Based on the validity determination, car wash services are selectively provided according to desired wash service information obtained from the voucher code, as well as additional or upgraded services desired by a car wash customer at the time the voucher is presented.

The site management system determines the validity of a voucher code by obtaining voucher code related information from a network or chain management system which maintains a database of voucher code usage information, thus allowing a determination at any site in the network or chain of whether the voucher has been previously used. Services at a site may thus be selectively provided or denied based on previous usage information, to prevent unauthorized or unpaid for washes. The voucher code may also include car wash service information which the system provides to a car wash tunnel control system, as well as sale date information. The site management system may determine the latency of the voucher code based on the sale date information in the voucher code in order to determine whether the voucher code has expired. Car wash services may accordingly be denied where a code has expired. The system further provides the capability of obtaining voucher code status and usage reports from any site in the chain. In addition, the invention includes methodologies for processing voucher codes in a car wash system.

In accordance with one aspect of the present invention, there is provided a method for processing a car wash voucher code in a multi-site car wash system, which comprises receiving the voucher code from a user interface, determining the validity of the voucher code, selectively providing at least one car wash service according to the validity of the voucher code, and sending information relating to the voucher code to a network management system having a database. The user interface may include, for example, a barcode reader adapted to read a voucher code from a printed voucher such as a cash register or POS system receipt, and/or a keypad with which an attendant or a customer may enter a numeric, alphanumeric, or other type of voucher code.

According to another aspect of the invention, the voucher code may comprise sale date information, whereby a site management system may determine a latency value for the voucher code based on the sale date information, compare the latency value for the voucher code with a latency threshold, selectively expire the voucher code and refuse car wash services if the latency value for the voucher code is greater than the latency threshold, and selectively provide one or more car wash services according to the voucher code if the latency value for the voucher code is less than or equal to the latency threshold. It will be appreciated by those skilled in the art that the invention further comprises selectively providing car wash services if the latency value is less than the latency threshold, and refusing such services if the latency value is greater than or equal to the latency threshold. The latency threshold may be used by a car wash provider to ensure that car wash services are available only for a certain time period following sale thereof. The system may also provide the customer with an indication that the voucher code has expired via the user interface. The network management system database may be provided with information concerning the attempted usage of an expired voucher code so that management personnel may track voucher code expiration through database queries and reports.

In accordance with yet another aspect of the invention, the method may further include obtaining information from the network management system database related to the voucher code, determining whether the voucher code has been previously used according to the information from the network management system database, selectively invalidating the voucher code and refusing car wash services if the voucher code has been previously used, and selectively providing at least one car wash service according to the voucher code if the voucher code has not been previously used. In this manner, a car wash voucher may not be used at a first chain site and then reused at the same or a different chain site. The network management system database may be provided with information relating to the attempted reuse of a voucher code to provide the ability to track such attempts, and the user interface may indicate to the person presenting the voucher code for reuse that the code has been previously used.

According to still another aspect of the invention, the voucher code includes information relating to the car wash services desired by the customer at the time the voucher was purchased. In this regard, the method may further comprise receiving information from the user interface relating to at least one additional car wash service, selectively providing the desired car wash service based on the voucher code according to the validity of the voucher code, and selectively providing the additional car wash service or services according to the information from the user interface. The method thus allows a customer to upgrade a car wash previously paid for via a user interface. Another aspect of the invention provides for encryption of the voucher code by the issuing (POS) system, and decryption thereof by the site management system in order to prevent unauthorized creation of voucher codes.

Another aspect of the invention provides a method of auditing car wash voucher code usage in a car wash system having a database including information relating to voucher code usage, a user interface, and a manager interface. The method includes receiving a database query from the management interface, obtaining a result set from the database according to the database query, and selectively providing a report relating to voucher code usage to the management interface according to the result set. A manager may thus audit voucher code usage at one, some, or all sites in a car wash site chain from any site in the chain.

In accordance with still another aspect of the invention, each site management system may receive a voucher code from the user interface, which includes sale date information, provide an indication in the database that the voucher code has been presented to the system, determine a latency value for the voucher code according to the sale date information, and selectively provide an indication in the database that the voucher code has expired if the latency value for the voucher code exceeds a latency threshold. This ensures that any site management system subsequently obtaining voucher related information from the network management system database will be able to determine that the voucher code has expired, and that an attempt was made to use the expired code. The method may further include determining whether the voucher code has been previously used, and selectively providing an indication in the database that another usage of the voucher code has been attempted if the voucher code has been previously used. This allows auditing, via the database, of latency, expiration, and validity information associated with one or more voucher codes.

According to another aspect of the invention, the system may include a plurality of car wash sites, wherein each car wash site has a site code associated therewith, and wherein the voucher code includes a sale site code. The invention further comprises obtaining the sale site code from the voucher code, providing an indication in the database of the sale site code associated with the voucher code, providing an indication in the database of a site code associated with the site at which the voucher code was presented, and providing an indication in the database of the date on which the voucher code was presented. Thus, in a multi-site car wash chain or network, a report may be obtained indicating the sale site code, presentation site code, sale date, and presentation date information associated with one or more voucher codes. Further tracking and reporting are provided with respect to the types of car wash services being provided, including add-on or upgrade services.

According to another aspect of the invention, there is. provided a car wash management system comprising a site management server including a communications interface operative to communicate with a network management system, a user interface adapted to receive a voucher code from a customer and/or an attendant, and operative to send the voucher code to the site management server, and a car wash control system adapted to receive car wash service information from the site management server and to provide control signals to a car wash. The site management server may be operative to receive the voucher code from the user interface, determine the validity of the voucher code, selectively provide car wash service information to the car wash control system according to the validity of the voucher code, and provide information relating to the voucher code to the network management system. The user interface may include a barcode reader adapted to read the voucher code from a voucher, and/or a numeric, alphanumeric or other type of keypad or appropriate code input device adapted to receive the voucher code from an operator.

According to yet another aspect of the invention, information may be obtained from and/or provided to the network management system via one of several methods. These may include direct access to a network management system database, Internet E-mail messages, dedicated communications links, and the like. Thus, the connection between any individual site and the network management system may be continuous or intermittent. In addition, individual car wash sites may include local databases which are accessed locally and updated with changes from other sites via a database replication process, wherein replication packets are sent from a site with changes made at the site, and received with changes from other sites and/or the network management system. In this manner, each such site may maintain a local database which is quickly accessible for retrieval of voucher code related information. Such local databases may be updated via replication packets, whereby each such database may include the latest information relevant to processing such voucher codes.

According to still another aspect of the invention, a computer-readable medium is provided, having computer-executable instructions for receiving a voucher code from a user interface, determining the validity of the voucher code, selectively providing one or more car wash services via a car wash control system, and sending information relating to the voucher code to a network management system having a database.

To the accomplishment of the foregoing and related ends, certain illustrative aspects of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 2C is a schematic diagram illustrating yet another exemplary car wash system in which a car wash voucher code may be processed according to the invention;

FIG. 10A is a schematic diagram illustrating an exemplary voucher code according to another aspect of the invention;

FIG. 10B is a schematic diagram. illustrating another exemplary voucher code according to the invention;

FIG. 10C is a schematic diagram illustrating another exemplary voucher code according to the invention;

FIG. 10D is a schematic diagram illustrating another exemplary voucher code according to the invention;

DETAILED DESCRIPTION OF THE INVENTION

Figure 1A:
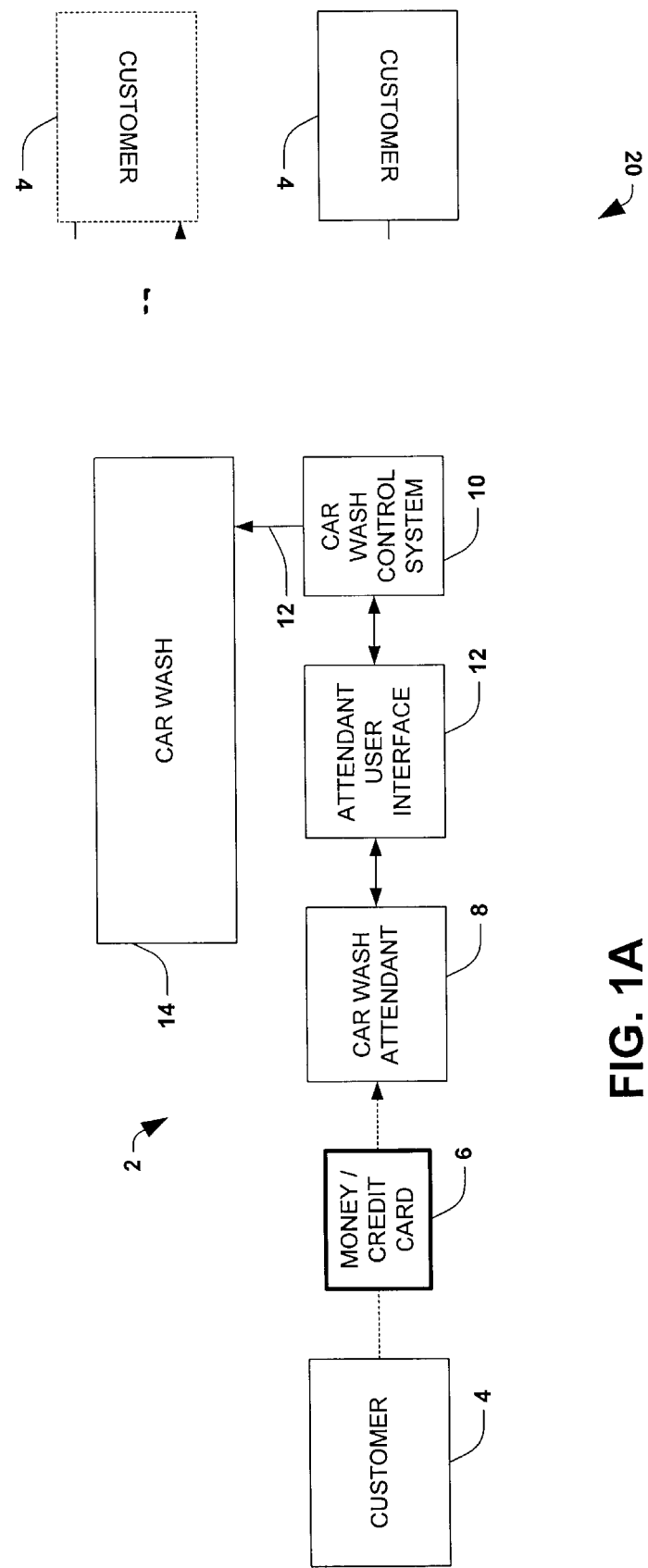
FIG. 1A is a schematic diagram illustrating a conventional automated car wash system in which desired wash services are programmed by a car wash attendant.

The following is a detailed description of the present invention made in conjunction with the attached Figures, wherein like reference numerals will refer to like elements throughout. The invention provides a system and methodology for processing voucher codes in association with the provision of car wash services. The invention further comprises methods for auditing voucher code usage and computer-readable medium having computer-executable instructions for performing steps of the methodologies. The invention provides the capability to selectively accept or reject a voucher code according to a validity determination. The validity determination is made according to prior usage history for the code as well as the latency thereof The system and method thus reduces or eliminates the possibility of automated car wash services obtained without proper payment. The invention finds application in multi-site car wash chains or networks as well as single site operations. In accordance with the invention, a car wash chain franchisee may provide services to a customer who bought a car wash voucher at another site in the chain, while preventing and detecting the attempted usage of counterfeit voucher codes and/or reuse of a previously used code.

Referring now to the drawings, FIG. 1A illustrates a conventional automated car wash system 2 in which a customer 4 provides money and/or a credit card 6 to a car wash attendant 8. According to the desired wash service, attendant 8 programs a car wash control system 10 using a user interface 12. Control system 10 provides appropriate control signals 12 to a car wash tunnel whereby a desired car wash services are provided as the customer vehicle (not shown) travels through the tunnel 14.

Figure 1B:
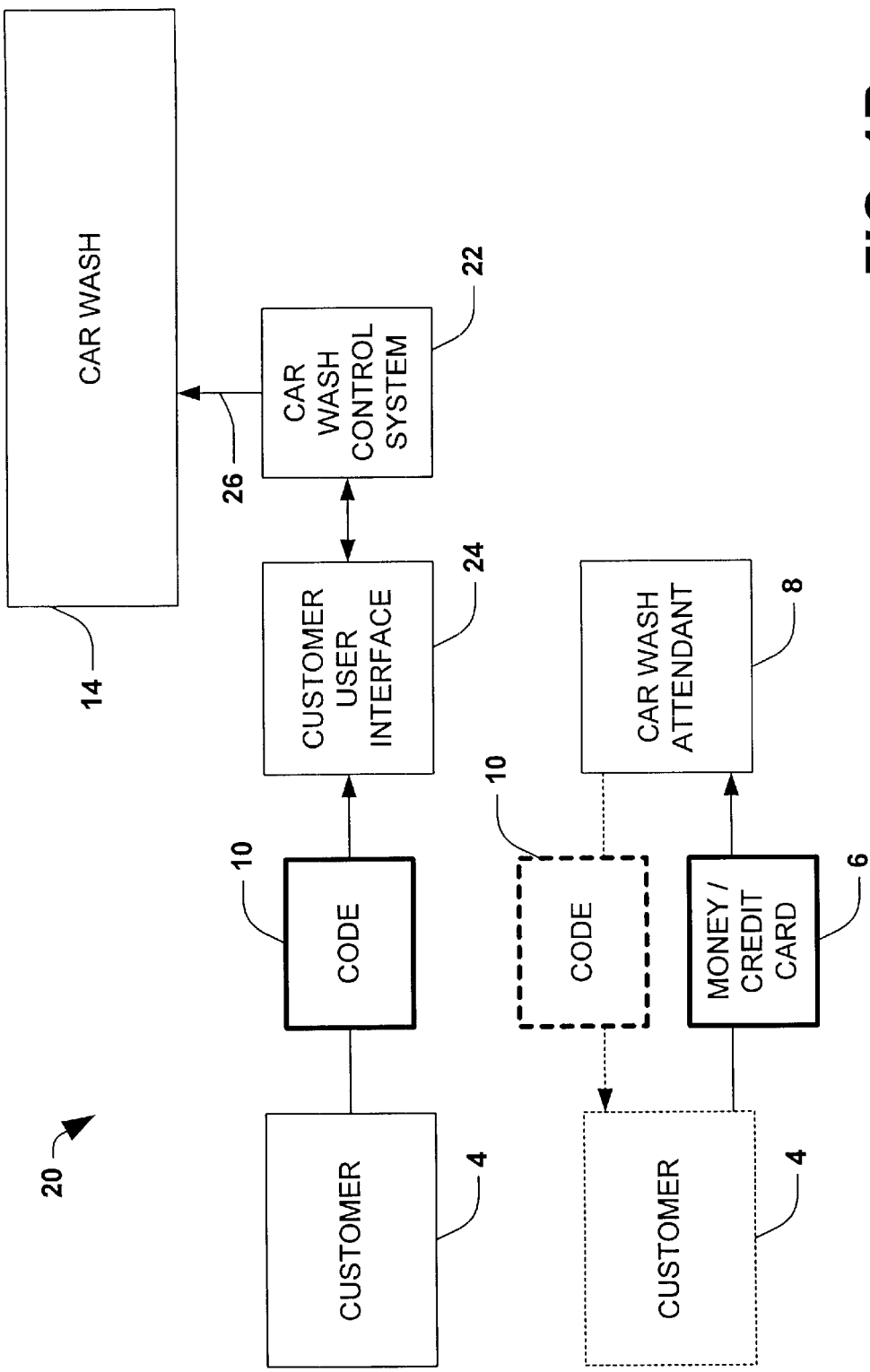
FIG. 1B is a schematic diagram illustrating another conventional car wash system in which a customer enters a code into a user interface to initiate automated car wash services.

FIG. 1B illustrates another conventional car wash system 20 in which a customer 4 provides money or a credit card 6 to a car wash attendant 8 in exchange for a code 10. The customer 4 enters the code 10 into a car wash control system 22 via a customer user interface 24. The code 10 may include information relating to specific car wash service options desired by the customer 4 which may then be used by the control system 22 in providing control signals 26 to the car wash tunnel 14.

Figure 2A:
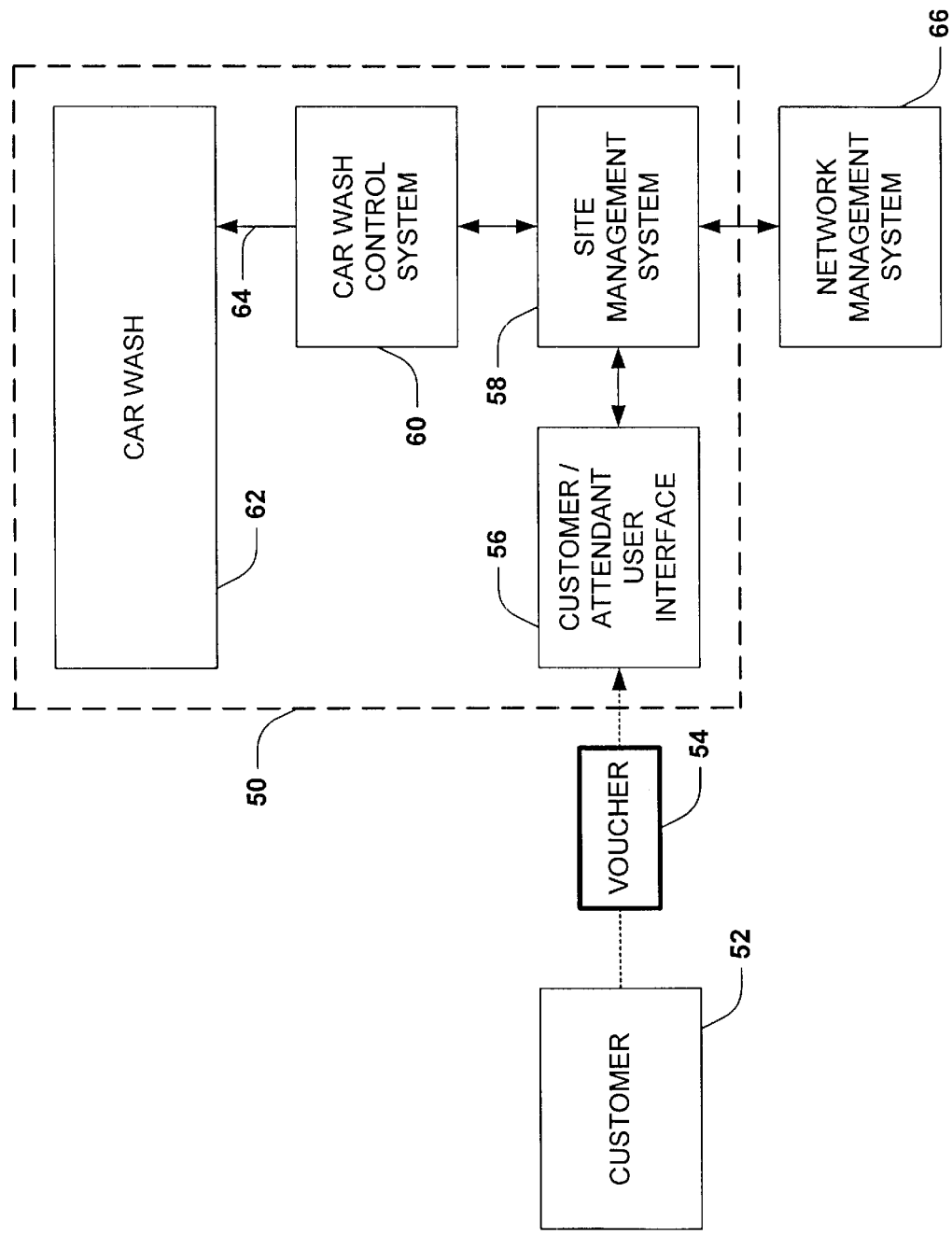
FIG. 2A is a schematic diagram illustrating an exemplary car wash system according to an aspect of the invention in which a car wash voucher code may be processed.

Referring now to FIG. 2A, an exemplary car wash system 50 according to the invention is illustrated in which a customer 52 presents a voucher 54 to the system 50 via a customer user interface 56. The voucher 54 comprises a voucher code (not shown) including information relating to wash services desired by the customer 52 which is received from the user interface 56 by a site management system 58. The site management system 58 is adapted for communication with a car wash control system 60 which operates a car wash tunnel 62 in a controlled fashion via one or more control signals 64 in accordance with information provided by the site management system 58. As described in greater detail hereinafter, the site management system 58 further comprises a communications interface (not shown) operative to communicate with a network management system 66. Communication between the site management system 58 and the network management system 66 may comprise a continuous link or may include intermittent communication links, for example, Internet electronic mail (E-mail) may be used on a periodic and/or as-needed basis to transfer information between the systems 58 and 66.

In accordance with one aspect of the invention, the user interface 56 is adapted to receive a voucher code (not shown) from a customer and/or attendant, and to send the voucher code to the site management server 58. The control system 60 receives car wash service information from the site management system 58 according to the voucher code and provides corresponding control signals 64 to the car wash tunnel 62. The site management system 58 is further adapted to receive a voucher code from the user interface 56, to determine the validity of the voucher code (as described in greater detail hereinafter), and to selectively provide or refuse car wash services according to the validity of the voucher code by providing wash information to the control system 60. In addition, the site management system 58 provides information relating to the voucher code to the network management system 66.

Figure 2B:
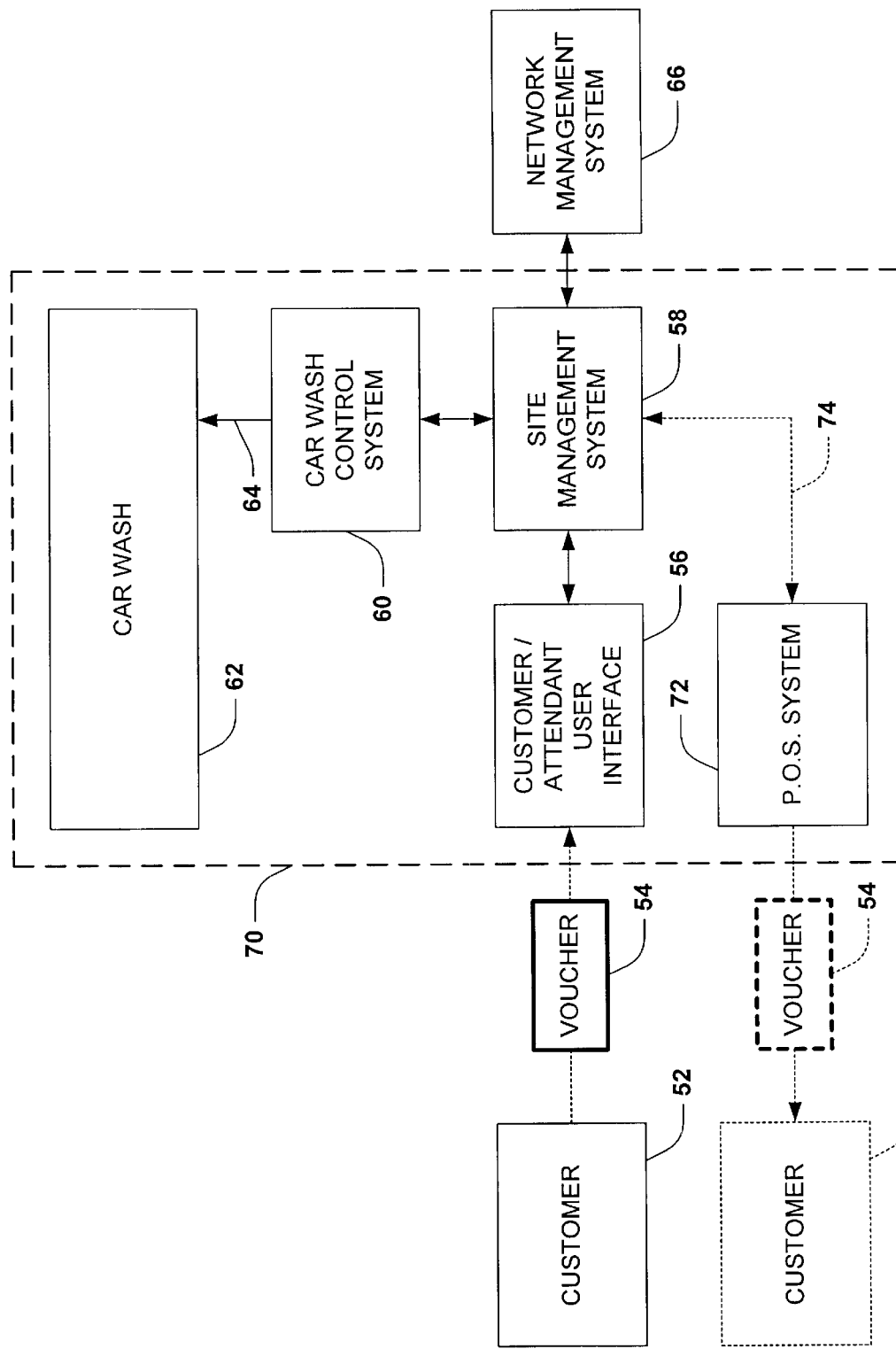
FIG. 2B is a schematic diagram illustrating another exemplary car wash system in which a car wash voucher code may be processed according to the invention.

Referring now to FIG. 2B, another exemplary car wash system 70 is illustrated in which a car wash voucher code may be processed according to the invention. Like the system 50 of FIG. 2A, the system 70 includes a customer user interface 56, a site management system 58, a car wash control system 60, and a car wash tunnel 62. In addition, system 70 further includes a separate point of sale (POS) system 72 from which a car wash customer 52 may obtain a voucher 54. POS system 72 may, but need not be, in communication with the site management system 58, as illustrated by the dashed interconnection 74. Thus, an independent third party POS system may generate voucher codes which may be processed according to the invention. POS system 72, for example, may be located remotely from the site management system 58 as well as car wash 62 with no electrical connection thereto. However, the POS system 72 provides a voucher 54 having a voucher code thereon (not shown) which is usable by the user interface 56 in order to selectively provide the customer 52 with wash services in the car wash tunnel 62.

FIG. 2C illustrates another exemplary car wash system 80 having a customer/attendant user interface 56, adapted to receive a voucher code (not shown) from a voucher 54 presented by a customer 52, and further to communicate the voucher code to site management system 58 in a manner similar to that described above with respect of FIGS. 2A and 2B. Site management system 58 provides information from the voucher code to the car wash control system 60, which in turn provides control signals to the car wash tunnel 62. The site management system 58 also communicates with the network management system 66, exchanging voucher code related information therewith. The system 80 may accept voucher codes from vouchers sold on site, and may further accept vouchers 54 sold off site. For example, POS system 82 may be located at a remote site 84, and may, but need not communicate with a second site management system 86. Site management system 2 86 may also be in communication with the network management system 66.

As illustrating in FIG. 2C, a single customer 52 may purchase a voucher 54 at a POS system (e.g., system 82) at one site 84. In accordance with the present invention, the same voucher 54 may be presented at a later time to a car wash system (e.g., 80) located at a remote site. The system 80 is adapted to receive a voucher code via the voucher 54, to determine the validity of the voucher code, to selectively provide car wash services according to the validity of the voucher code, and to send information relating to the voucher code to the network management system 66, which may include a database.

Figure 3A:
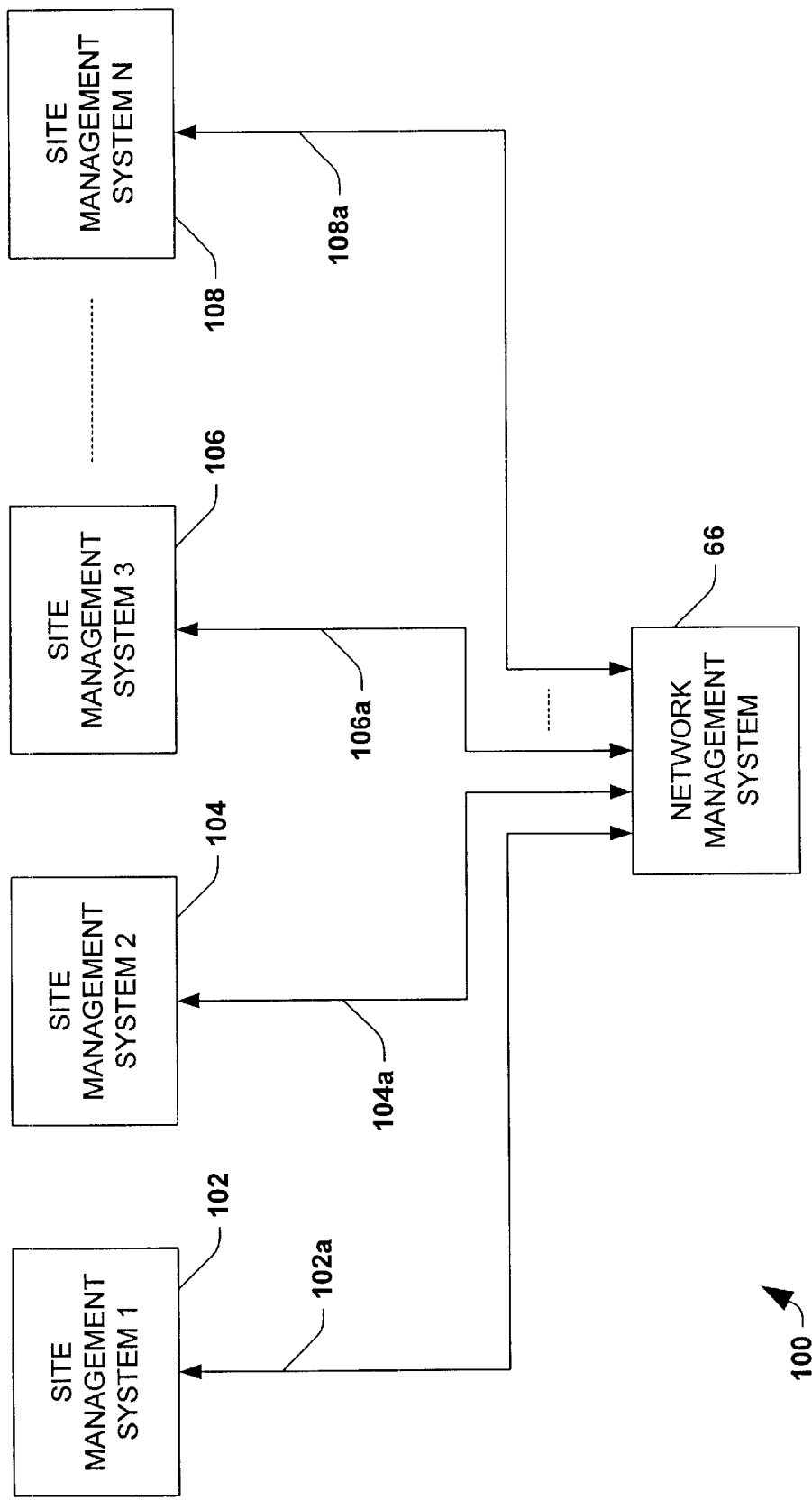
FIG. 3A is a schematic diagram illustrating an exemplary multi-site car wash chain or system in which various aspects and methodologies of the invention may be carried out.

Referring now to FIG. 3A, an exemplary multi-site car wash chain or system 100 is illustrated, in which various aspects or methodologies of the invention may be carried out. The system 100 comprises network management system 66, which may include a database (not shown), as well as a plurality of site management systems, system 1 102, system 2 104, system 3 106, and system N 108, where N is an integer. The site management systems 102, 104, 106, and 108, are adapted for communication with the network management system 66 via communication links 102a, 104a, 106a, and 108a, respectively. The individual site management systems may be each located remotely from each other, as well as from the network management system 66. The communication links 102a, 104a, 106a, and/or 108a, may be of various forms including, for example, telephone/modem connections, Internet connections, wireless communications, wide area networks, and the like. It will be appreciated in this regard that the communication links 102a, 104a, 106a, and 108a, need not be dedicated or continuous in order for information exchange between the various site management systems and the network management system 66 in accordance with the invention. For example, one, some, or all of the links 102a, 104a, 106a, and 108a may be established via E-mail or other types of Internet communications.

Figure 3B:
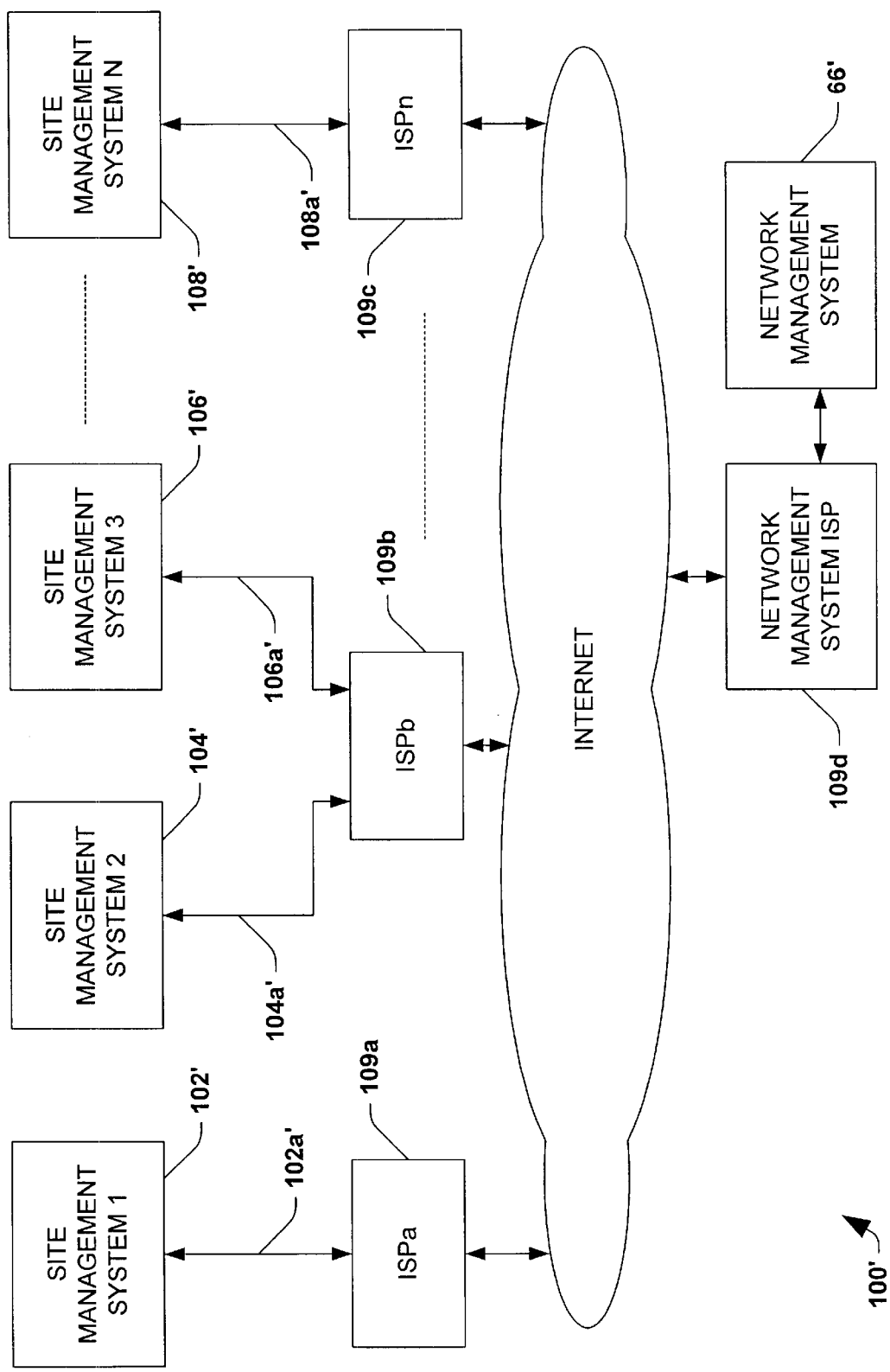
FIG. 3B is a schematic diagram illustrating another exemplary multi-site car wash system wherein information is exchanged between car wash sites and a network management system via replication.

Referring also to FIG. 3B, another exemplary multi-site car wash chain or system 100' is illustrated, wherein voucher related information may be exchanged between individual car wash site management systems 102', 104', 106' and/or 108' and a network management system 66' via the Internet. The systems 102', 104', 106' and 108' access the Internet via Internet service providers ISPa 109a, ISPb 109b, and ISPn 109c, respectively, wherein systems 104' and 106' may, but need not, use the same ISPb 109b. The network management system 66' accesses the Internet via ISP 109d. In the system 100', information may be exchanged between any or all of the site management systems 102', 104', 106' and/or 108' and the network management system 66', for example, using E-mail messages. In this manner, the connections may be intermittent.

The site management systems 102', 104', 106' and 108' may comprise local databases (not shown) which are replicated from a database (not shown) in the network management system 66' via E-mail messages, for example, using the Internet messaging access protocol (IMAP), post office protocol 3 (POP3), simple mail transfer protocol (SMTP), or the like. Such update messages may include one or more replication packets with information related to changes to the network management system database, whereby the individual site management systems 102', 104', 106' and 108' may reassemble the respective local database with the changes received in the replication packet. In this manner, the changes to the network management system database may be replicated throughout the car wash chain or system 100'. This allows the individual site management systems 102', 104', 106' and/or 108' to consult voucher code related information from the network management system in determining the validity of a voucher code as illustrated and described in greater detail hereinafter.

In addition to receiving such replication packets, the individual site management systems 102', 104', 106' and/or 108' may also send replication packets to the network management system 66'. In particular, where a voucher code is presented at one of the site management systems 102', 104', 106' and/or 108', a change may be made to the corresponding local database, for example, to indicate that the voucher code has been presented. Thereafter, the individual site management system may construct a replication packet including the changes made to the local database. The replication packet may then be sent to the network management system 66' which then updates the network management system database. The replication packet may be forwarded to the other site management systems (e.g., by the sending site management system or by the network management system 66'), whereby the change to an individual site management system database is replicated to the other local databases in the system 100'.

In this regard, replication packets may be sent or circulated through the system 100' periodically, and/or when changes or other events occur. This ensures coherency in the local databases within a replication latency period. Thus, the local site management systems 102', 104', 106' and/or 108' may consult the respective local databases to reliably discern voucher code related information from which voucher code validity may be determined. It will be appreciated that the provision of local databases may reduce the time required to determine the voucher code validity compared with accessing the network management system database each time a voucher code is presented to one of the site management systems 102', 104', 106' and/or 108'. In addition, the communication traffic between the network management system 66' and the site management systems 102', 104', 106' and/or 108' may be effectively reduced by the provision of the local databases associated therewith.

In addition, the E-mail messages may transfer replication packets between site management systems 102', 104', 106' and/or 108' and the network management system 66' via store and forward methodology. The ISP 109 may advantageously store incoming E-mail messages (e.g., including one or more replication packets) until the next time a corresponding site management system (e.g., 102', 104', 106' and/or 108') or network management system 66' logs in. Upon log in, the ISP provides the stored or buffered E-mail messages to the corresponding system for updating the associated database with voucher code related information. In this fashion, the systems (e.g, site management systems 102', 104', 106' and 108' and the network management system 66' need not be directly or even continuously connected with each other. Rather, intermittent connections are possible. Such intermittent connection may, for example, reduce cost associated with permanent or continuous connections.

Moreover, the invention contemplates transport independent exchange of voucher code related information between the site management systems 102', 104', 106' and 108' and the network management system 66'. Thus, the systems may be configured to utilize continuous connections (e.g., using TCP/IP protocol) or to use an intermittent connection (e.g., E-mail messages with store and forward capability). It will be further appreciated that one or more of the systems 102', 104', 106', 108', and 66' may reconfigurable to utilize continuous or non-continuous type connections or communications links. In addition, the systems may be adapted to dynamically select from two or more connection types in order to increase communication reliability and/or to optimize cost, bandwidth, communications speed, or other performance metric.

The voucher code validity verification of the present invention may thus be accomplished in both of the multi-site car wash systems 100 and 100' of FIGS. 3A and 3B, respectively. Moreover, the invention may be implemented in systems where one or more site management systems have dedicated or continuous communications links with the network management system, while other site management systems communicate with the network management system via intermittent or non-continuous communications, such as Internet E-mail messages and the like. For example, the communications between such systems may comprise one or more of WAN based file transfers, E-mail, FTP, and Internet pipes. In this regard, it will be appreciated that where replication latency is a concern, continuous links may be employed. Intermittent connections and local database replication may be employed where communication bandwidth is important, alternatively or in combination with continuous links and direct access to a network management system database. Many such applications and implementations are possible in addition to those specifically illustrated and described herein, and are considered as falling within the scope of the present invention.

Figure 4:
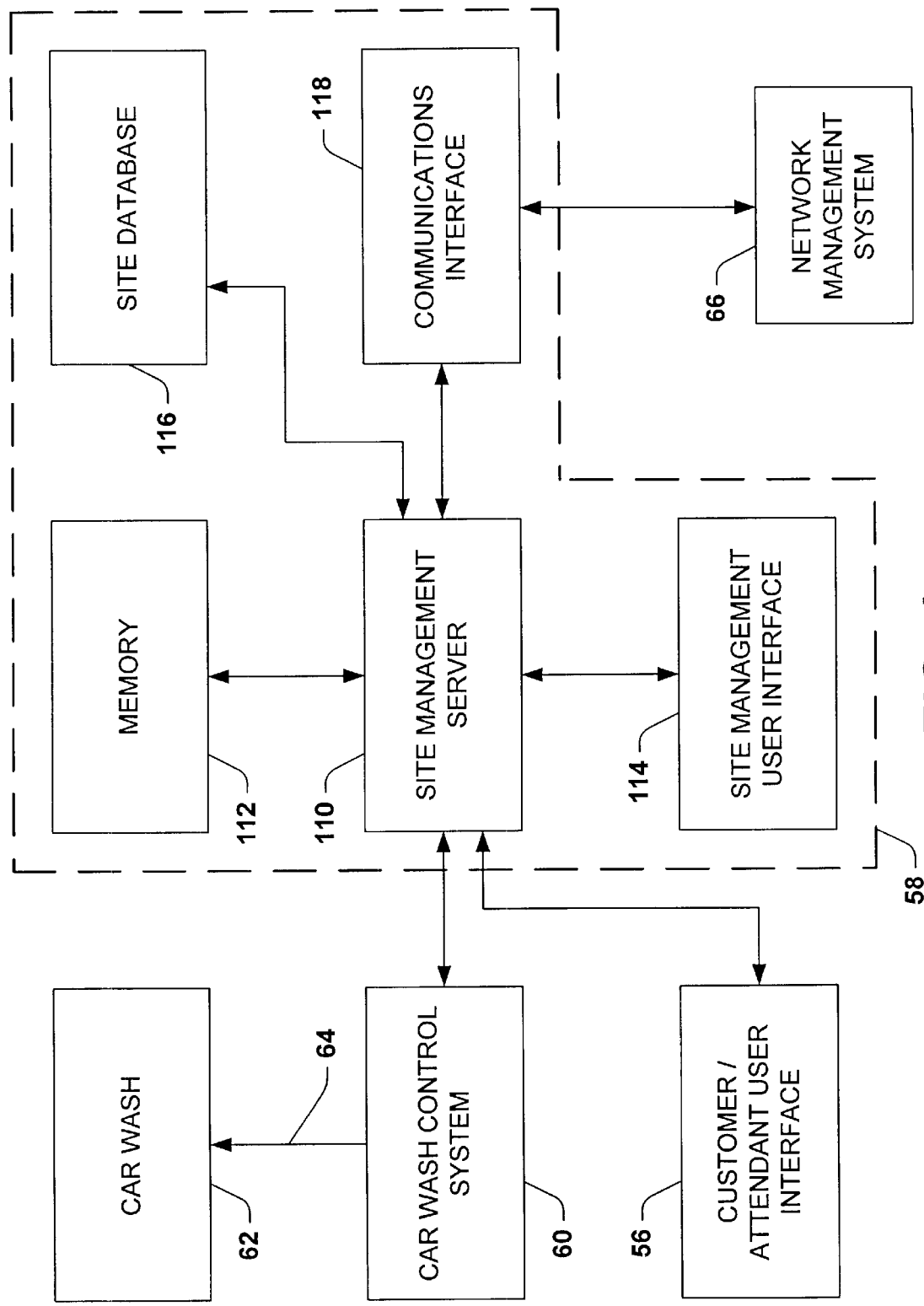
FIG. 4 is a schematic diagram illustrating an exemplary site management system for processing a car wash voucher code connected to a network management system in accordance with another aspect of the invention.

Referring also to FIG. 4, an exemplary site management system 58 is illustrated in which a car wash voucher code may be processed in accordance with an aspect of the invention. The system 58 comprises a site management server 110, which is adapted to communicate with the customer/attendant user interface 56 in order to receive a voucher code therefrom. The server 110 is further adapted to communicate with the car wash control system 60, which in turn provides one or more control signals 64 to a car wash 62. The site management system 58 further comprises a memory 112, a site management user interface 114, a site database 116, and a communications interface 18, each of which is adapted for communication with the site management server 110. As illustrated and described above with respect to FIG. 3B, the site database 116 may include voucher code related information replicated or otherwise obtained from a database (not shown) in the network management system 4. The site management server 110 may also be adapted to ensure that changes to the site database 116 (e.g., via one or more replication packets) do not get posted twice, are processed in order, to monitor replication packet collisions, and to request retransmission of one or more such packets upon detection of such collisions. The memory 112 may include computer executable instructions for performing the various methodologies of the invention, and may include RAM, ROM, one or more disc drives, CDROM devices and any other form of computer readable storage medium whether magnetic, optical, or otherwise.

The site management user interface 114 includes input and output devices allowing a user, such as management or car wash personnel, to send and receive information and data from the site management server 110. The site database 116 may include information related to the operation of the car wash 62 and the associated control system 60, as well as voucher codes presented to the system 58 via the user interface 56. The communications interface 118 provides communications between the site management server 110 and the network management system 66 for exchanging data there between.

The system 58 may be adapted to implement the various methodologies as described and illustrated further hereinafter. For example, program instructions in memory 112 may be executed by the server 110 in order to determine the validity of a voucher code provided to the system 58 via user interface 56, and to provide information related thereto to the network management system 66. In this regard, the server 110 may decode or decrypt a voucher code from interface 56 to determine sale date and/or other information encoded or encrypted therein.

The sale date information may be used to determine the age or latency of a voucher code, which may be then compared with a latency threshold to determine whether or not the voucher code has expired. Such a latency threshold may be obtained from the network management system 66 via communications interface 118, or may be stored locally in the site database 116. The server 110 may further determine whether a particular a voucher code has been previously used at the local site or at a remote site. This may be accomplished through obtaining prior usage information from the network management system 66 via the communication interface 118. The server may further provide usage information to the network management system via interface 118 as car wash services are provided in car wash tunnel 62, whereby a network management system database (not shown) of management system 66 may include updated information related to usage history of voucher codes at a plurality of car wash system sites.

Car wash attendants and/or management personnel may also audit voucher code usage via the site management user interface 114 and the server 110 by initiating database queries of the site database 116 and/or the network management system database of network management system 66 via communications interface 118. Accordingly, reports may be generated, whereby voucher code usage, wash service type information, voucher code latency, and other related information may be audited.

The system 58 may further be adapted to provide the network management system 66 with other voucher code related information as codes are presented to the system 58 via the user interface 56. Such information may include, for example, latency values, attempted reuse of expired or invalid codes, car wash sale date information, car wash sale site information, specific car wash services purchased, upgrade services purchased at the redemption site and the like.

Figure 5:
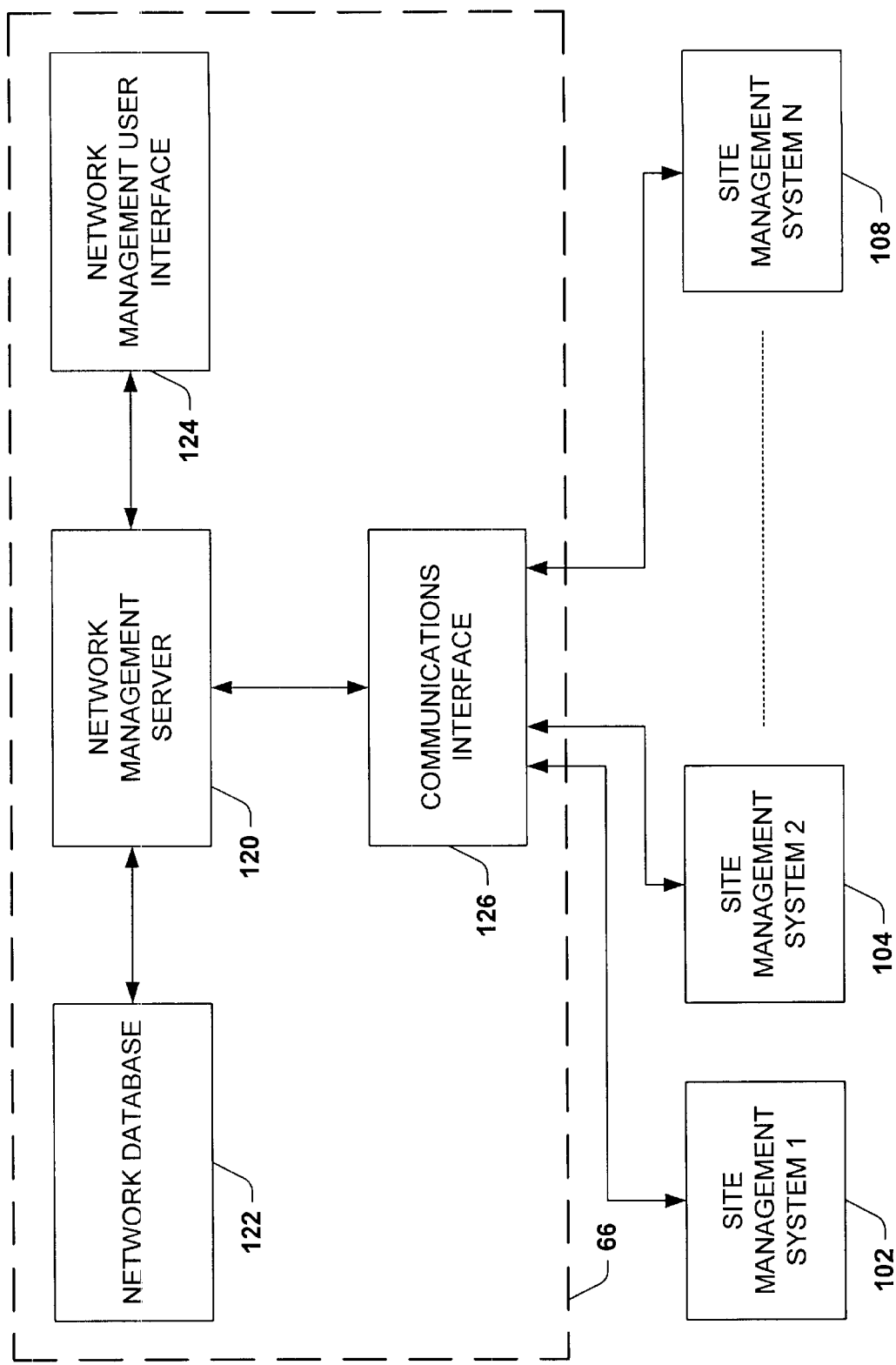
FIG. 5 is a schematic diagram illustrating an exemplary network management system in communication with a plurality of site management systems in accordance with the invention.

Referring now to FIG. 5, an exemplary network management system 66 is illustrated in communication with a plurality of site management systems, system 1 102, system 2 104, and system N 108. The network management system 66 may comprise a network management server 120 in communication with the network database 122, a network management user interface 124, and a communications interface 126. As discussed supra, the communications interface 126 may provide continuous or non-continuous communications with the site management systems 102, 104, and 108, via a variety of communications links (not shown), including Internet E-mail messages via one or more Internet service providers (ISPs, not shown). This allows the network management server 120 to receive voucher code usage and other related information from the site management systems, which information may be maintained in the network database 122.

In addition, where the validity of a voucher code presented to one of the site management systems is to be determined, any of the site management systems 102, 104, and 108 may obtain voucher code related information from the network database 122 via the communications interface 126 and the network management server 120, whereby prior usage history on a particular voucher code may be obtained. As illustrated and described above with respect to FIG. 3B, one or more of the individual site management systems (e.g., systems 102, 104, and/or 108) may include local databases (e.g., site database 116 of FIG. 4) which are updated with information from the network management system database 122 via replication packets from the network management system 66.

It will be appreciated in this regard that the network database 122 (e.g., and the local site database 116 of FIG. 4) may advantageously store a variety of useful information related to voucher code utilization. This information may be consulted in the form of database queries in the construction of auditing reports initiated by the network management user interface 124 and/or any of the site management systems 102, 104, and 108. It will be further appreciated that such information may be periodically provided to the site management systems 102, 104, and 108 for storage in site databases (e.g., database 116 of FIG. 4), whereby the site management systems may verify the validity (e.g., prior usage history) of a voucher code without directly accessing or querying the network database 122.

Figure 6A:
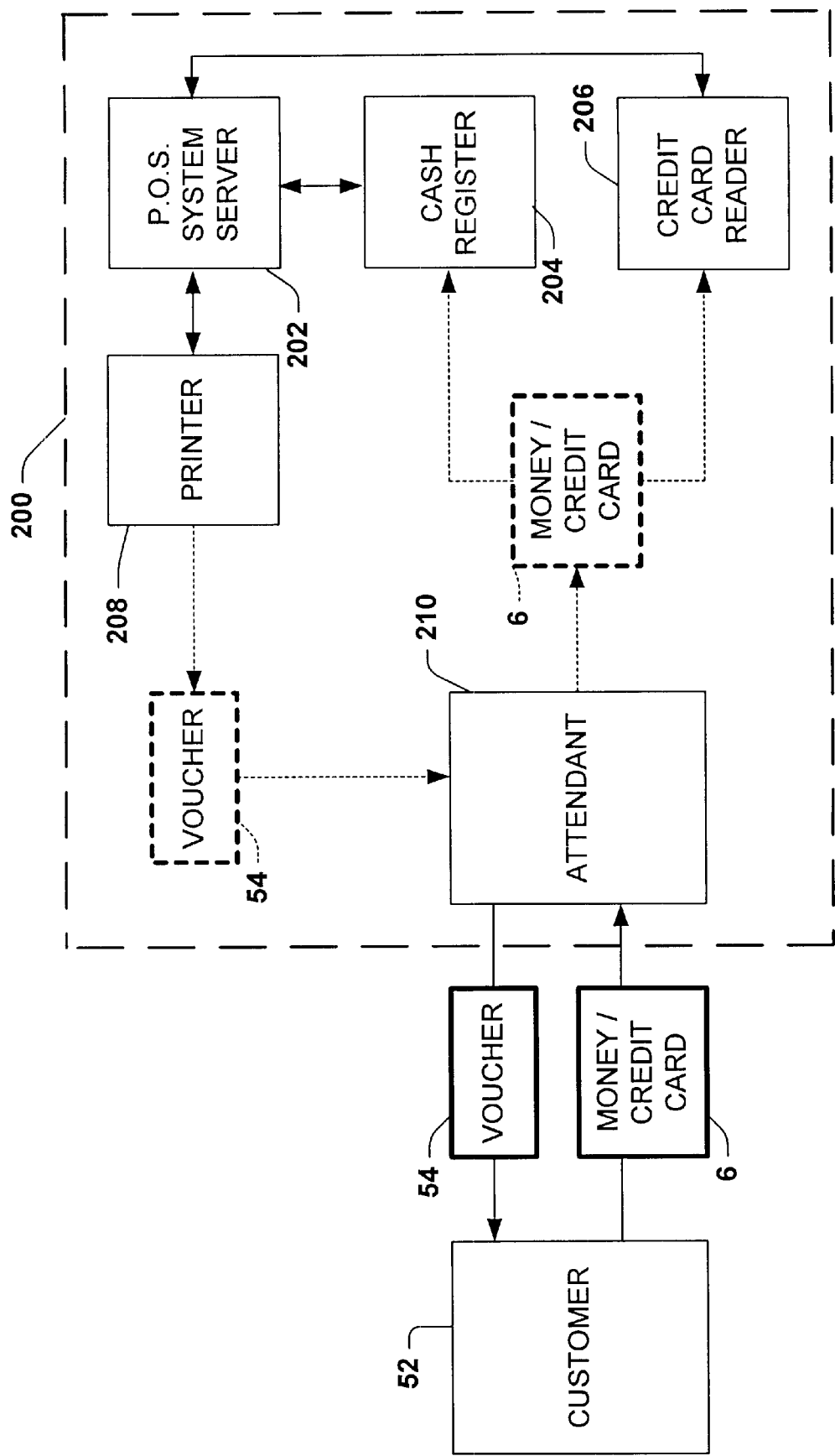
FIG. 6A is a schematic diagram illustrating an exemplary point of sale system for providing a voucher code in accordance with the invention.

Referring now to FIG. 6A, an exemplary point of sale (POS) system 200 is illustrated for providing a voucher code in accordance with the invention. This system 200 comprises a POS system server 202 in communication with a cash register 204, a credit card reader 206, and a printer 208. The POS system 200 may be found, for example, near the entrance of a car wash facility or in the main building of a multi-service facility such as a combination gas station/car wash/convenient store. However, the system 200 need not be connected to or associated with a car wash system. It will be appreciated that the system 200 may thus be an independent third party POS which generates voucher codes to be processed subsequently according to the invention. An attendant 210 may receive payment in the form of money and/or a credit card from a customer 52 which is presented to the cash register 204 or the credit card reader 206. Once proper payment has been received for the car wash services desired by the customer 52, the POS system server 202 causes the printer 208 to generate a voucher 54 which may comprise a voucher code (not shown), as described in greater detail infra. The voucher 54 is then presented to the customer 52 for subsequent use at a car wash site, which may, but need not be connected to or associated with the POS system 200.

Figure 6B:
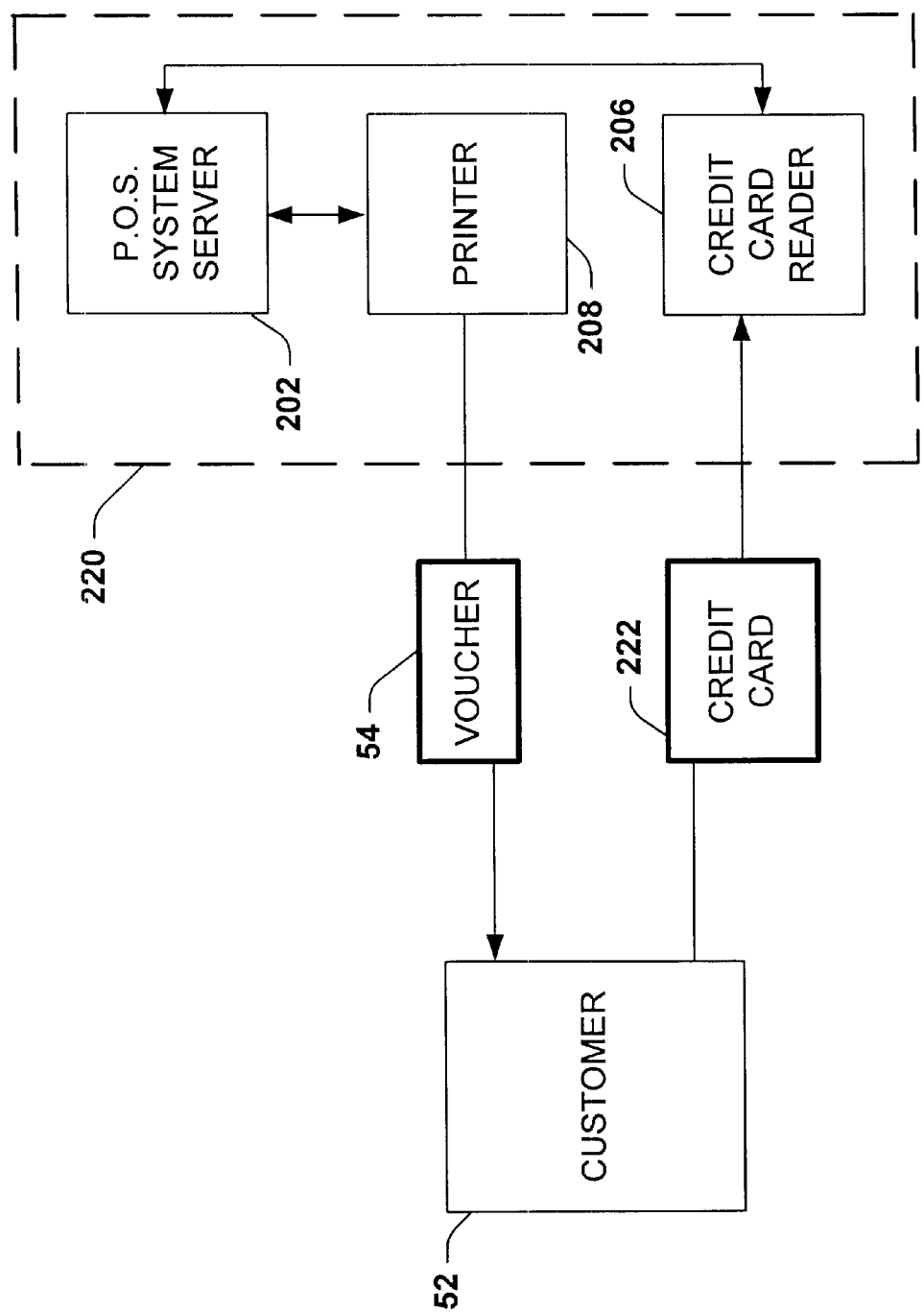
FIG. 6B is a schematic diagram illustrating another exemplary point of sale system for providing a voucher code in accordance with the invention.

Referring also to FIG. 6B another exemplary point of sale system 220 is illustrated having a credit card reader 206 and a printer 208 connected to a POS system server 202. This type of POS system may be found, for example, at the entrance to a car wash tunnel and/or integrally mounted in a gas station fuel pump housing (not shown). The system 220 is a self-serve point of sale whereat a customer 52 exchanges payment in the form of a credit card 222 for a voucher 54 which includes a voucher code (not shown). The voucher 54 may be subsequently presented to a car wash site management system (e.g., system 58 of FIG. 4) to receive the desired car wash services. Like the exemplary POS system 200 of FIG. 6A, the system 220 of FIG. 6B may, but need not be connected to or associated with a car wash voucher verification/processing system in accordance with the invention.

Figure 7:
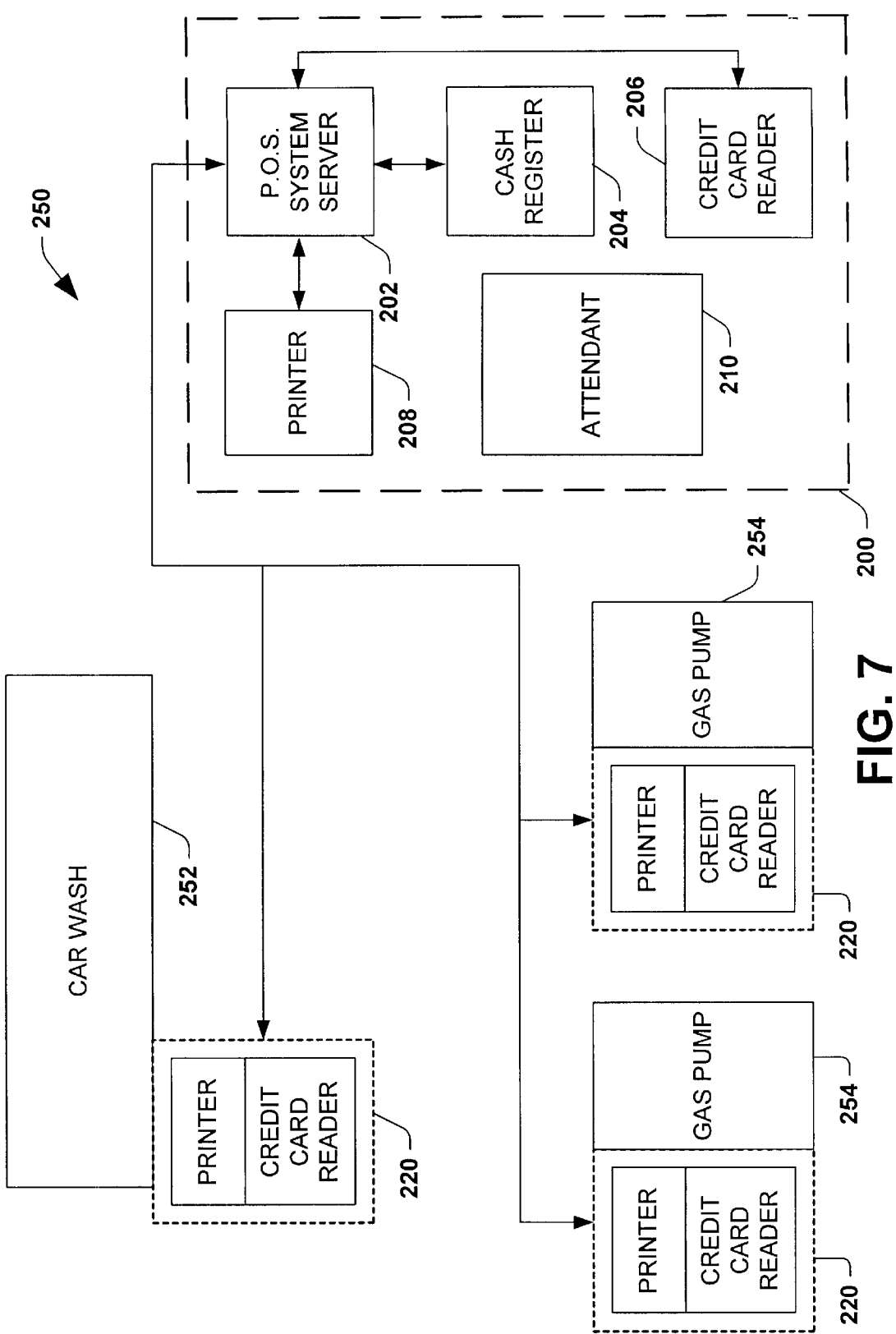
FIG. 7 is a schematic diagram illustrating an exemplary multi-service gas station having a car wash and a distributed point-of-sale system.

In FIG. 7, an exemplary multi-service gas station 250 is illustrated having an on-site car wash 252, a plurality of gas pumps 254, and a distributed point of sale system. A POS system 200 is provided at one location in the system 250, including an attendant 210, a credit card reader 206, a cash register 204, a POS system server 202, and a printer 208 as described supra and illustrated in FIG. 6A. The POS system server 202 of system 200 is operatively connected to self-serve POS systems 220 located near gas pumps 54 and at the entrance to the car wash tunnel 252. In the multi-service station 250 of FIG. 7, a customer (not shown) may purchase car wash services at any one of the POS systems 200, 220 whereat a voucher (not shown) is provided to the customer including a voucher code (not shown), as described in greater detail infra. The on-site car wash 252 may, but need not be connected to the various POS systems 220.

Figure 8:
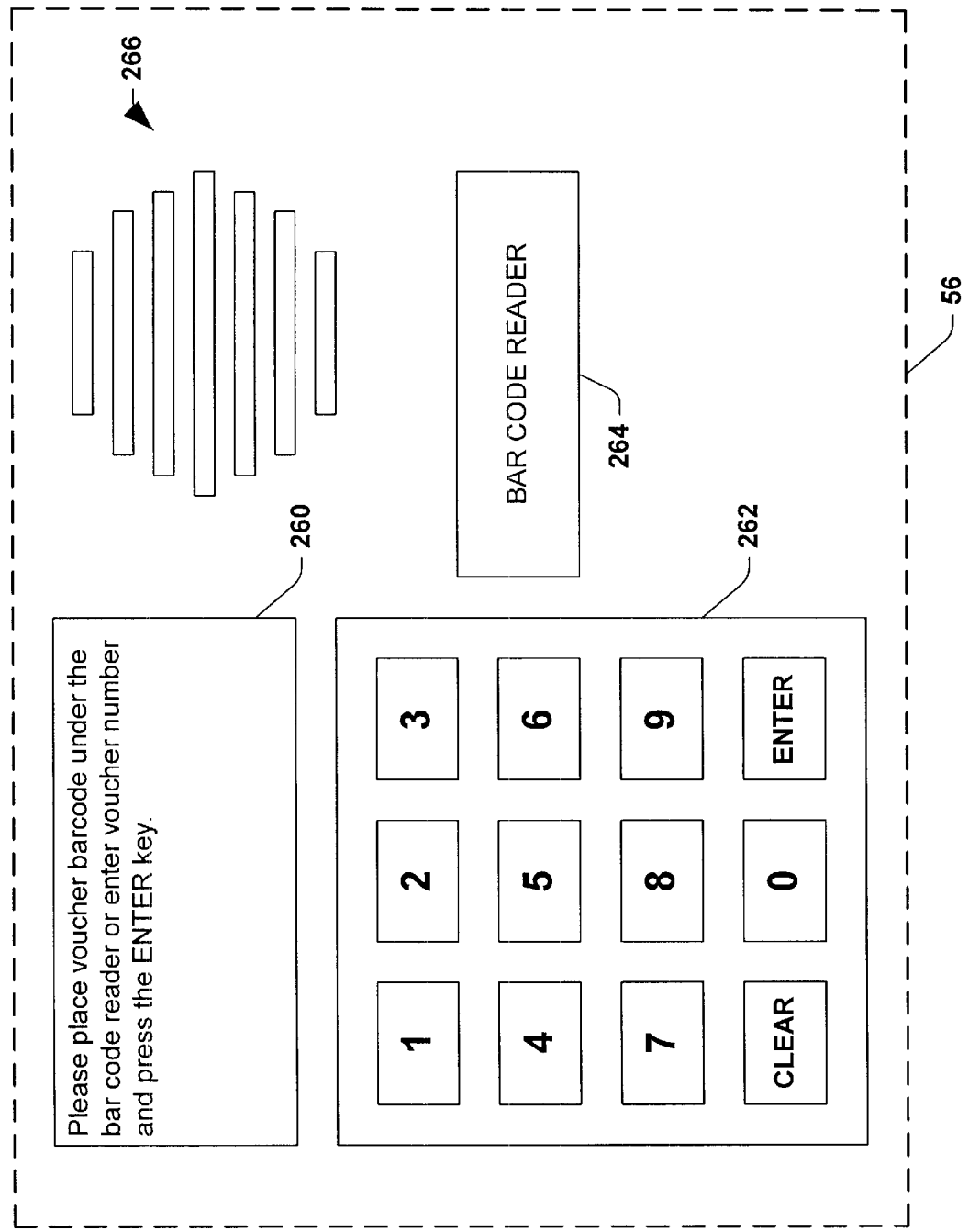
FIG. 8 is schematic diagram illustrating an exemplary user interface in accordance with another aspect of the invention.
Figure 9:
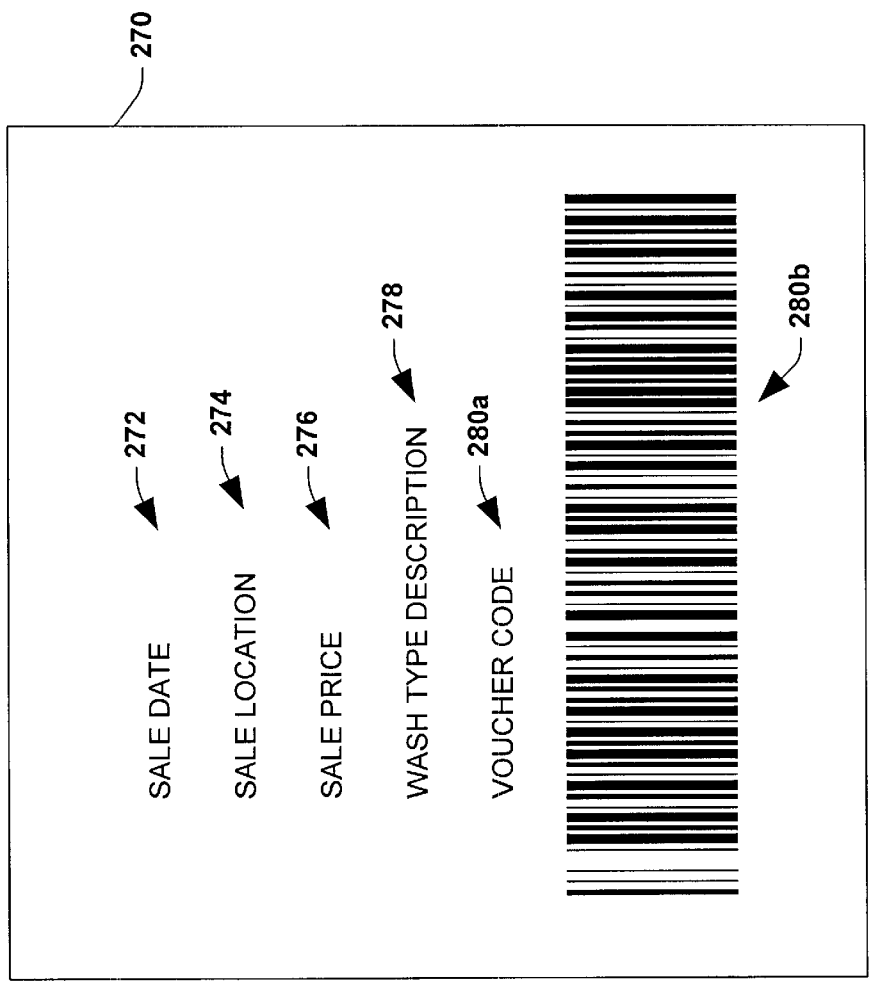
FIG. 9 is a front elevation view illustrating an exemplary voucher having a voucher code in accordance with an aspect of the invention.

Referring now to FIG. 8, once a customer has purchased a voucher at one of the point of sale systems 200, 220 as described above, the customer may initiate car wash services at the entrance to the automated car wash tunnel 252 via an exemplary customer user interface 56. The user interface 56 may include a display 260, a keypad 262, a bar code reader 264, and an audio speaker 266. Referring also to FIG. 9, an exemplary voucher 270 is illustrated which may comprise a receipt or strip of paper having various information printed there on. Such information may include, for example, the sale date 272, sale location 274, sale price 276, wash type description 278, and a voucher code 280 which may be in the form of alphanumeric characters 280a and/or a bar code 280b. A customer (and/or a car wash attendant) may present the voucher code 280 to the user interface 56 either by placing the bar code 280b under the bar code reader 264 or alternatively by entering the alphanumeric t1p voucher code 280a into the user interface 56 via the keypad 262.

The customer may be provided with various audio and/or visual (text) information relating to car wash services and/or voucher code 280 via the audio speaker 266 and/or the visual (character) display 260. For example, if the customer or the attendant incorrectly enters the voucher code 280 into the user interface 56 (or perhaps if an unscrupulous person without a voucher code attempts to operate the car wash) an error message may be displayed 260 indicating that the code that was entered (via the keypad 262 or the bar code reader 264) is invalid. Similarly, a customer may be informed via the display 260 and/or the speaker 266 that the voucher code just entered has expired (e.g., due to the latency or the age of the voucher code) or has been previously used.

Referring now to FIGS. 10A–10D, several exemplary voucher codes are illustrated in accordance with the invention. In FIG. 10A, an exemplary car wash voucher code 290 is illustrated having 18 numeric decimal digits. The first digit T has a range of 0–9 which may be used to represent 1 of 10 different wash services. This may be used to represent, for example, the particular wash service package selected by the customer when the voucher was purchased. Three digits E are provided for encoding optional services which may be combinable. Three digits S are provided for encoding site location information, whereby the location or site within a car wash chain or network at which the voucher was purchased may be indicated in the voucher code 290. Date of sale information may also be included in the voucher code 290 using 2 month digits M, 2 date digits D, and 2 year digits Y. This enables a site management system (e.g., system 58 of FIG. 4) to compute or determine the latency or age of a particular voucher code presented to the system. In this way, the system may determine whether a voucher code has expired by comparing the sale date information or the latency with a latency threshold, as described supra.

Four sequence digits Q are provided in the code 290 to provide a unique identifier for each voucher sold at each point of sale site in a given day. Thus, up to 10,000 washes may be sold at each site in a given day. A check digit X is provided to allow a site management system (e.g., site 58) to discriminate between valid and invalid codes. For example, the check digit X may be determined by adding up the values of all the prior digits P, E, S, M, D, Y, and Q, and taking the least significant digit of the results. Referring also to FIG. 10B an exemplary voucher code 292 is illustrated as an example of a voucher code constructed according to the format 290 of FIG. 10A, if the customer purchased a car wash from site 101 on Oct. 1, 1999 with wash type 1 and no optional services at the beginning of the day, voucher code 100010110019900003 would be generated as illustrated in FIG. 10B. Referring now to FIGS. 10C and 10D, if the next customer at the same site at the car wash chain purchased the same car wash services, the exemplary voucher code 294 in FIG. C would be obtained. Similarly, if a third customer at the same site purchased the same services the exemplary voucher code 296 of FIG. 10D would be obtained.

It will be recognized that the systems described and illustrated above advantageously provide voucher code processing and auditing which allows a customer to purchase a car wash at one site and subsequently obtain corresponding car wash services at any one of a plurality of car wash sites associated in a car wash chain or network. The systems further provide for detection and tracking of invalid or expired voucher codes through the replication of voucher code related information accessible throughout the chain. The voucher code processing systems need not be connected to or otherwise associated with the POS system which generated a particular voucher code.

It will be appreciated that the invention provides for processing and validity verification of voucher codes created or generated by an independent third party POS system. In this regard, the voucher code related information consulted by such systems need not include information on generated codes. Rather, the validity of the voucher codes may be determined according to information in the code itself (e.g., to determine the age or latency thereof), and/or by determining whether the code has been previously used (e.g., by consulting a database including prior usage history information). Thus, to determine prior usage of a voucher code, the database need only be updated when a voucher is presented at a car wash site. Prior to such presentation, the consulted database need not include any information relating to such an unpresented voucher code. The voucher code processing systems of the invention may therefore be independent of a particular POS system. Further in this regard, it will be appreciated that many such code processing systems are possible other than those specifically illustrated and described herein, and are contemplated as within the scope of the invention.

Figure 11:
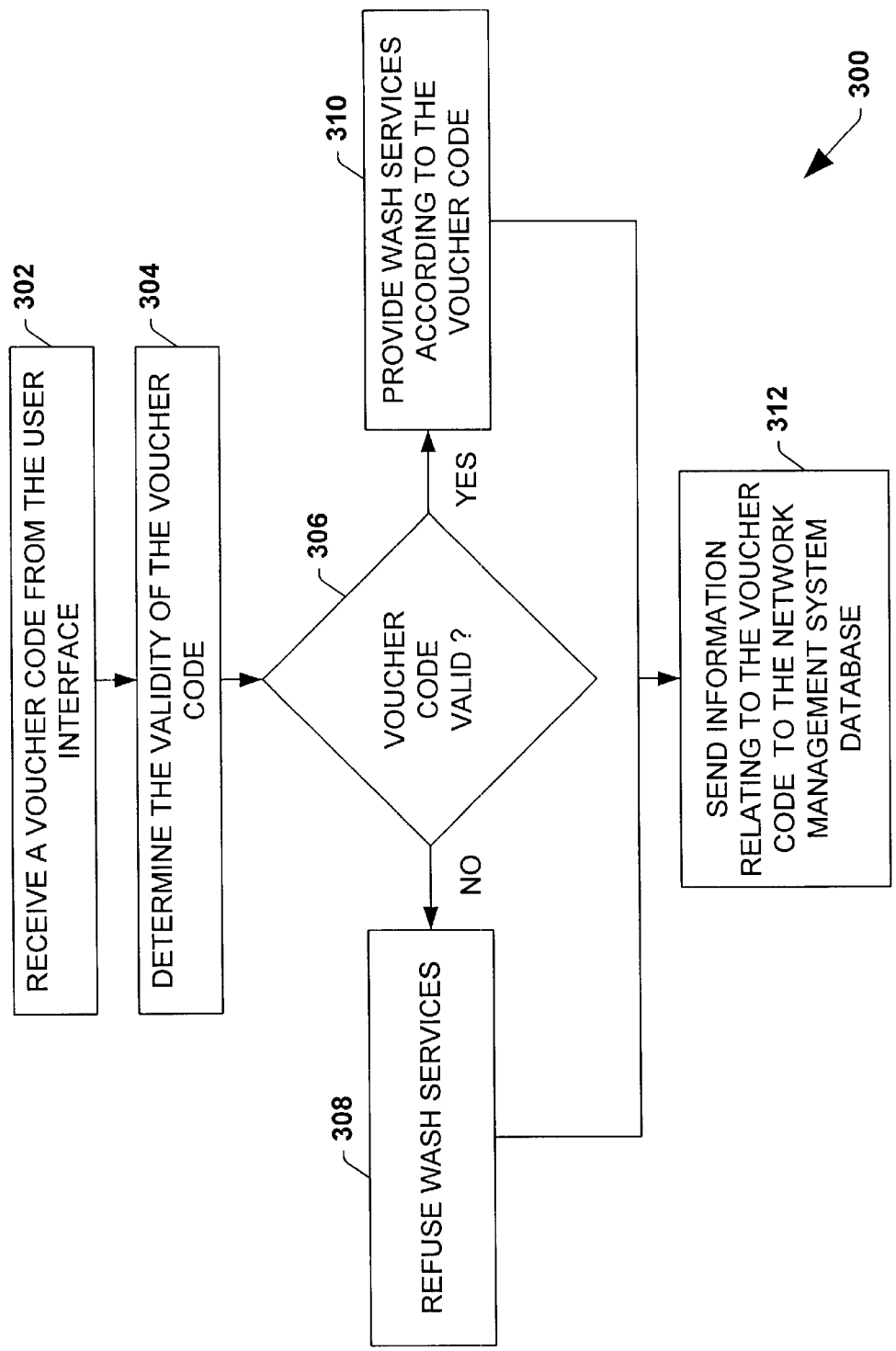
FIG. 11 is a flow diagram illustrating an exemplary method of processing a voucher code according to yet another aspect of the invention.

Referring now to FIG. 11 an exemplary method 300 of processing a voucher code is illustrated in accordance another aspect of the present invention. Beginning at step 302, a car wash system (e.g., site management system 58) receives a voucher code from a user interface (e.g., user interface 56 of FIG. 4). At step 304, the validity of the voucher code is determined. This determination may comprise, for example, comparing the latency of the voucher code with a latency threshold to determine if the voucher code has expired, and/or obtaining prior usage information from network management system (e.g., network management system 66 of FIG. 4) in order to determine whether the voucher code has already been used. At decision step 306, a decision is made as to whether to refuse wash services at step 308 or to provide wash services according to information included in the voucher code at step 310, depending on the validity of the voucher code. In either case, information relating to the voucher code is then sent to the network management system database at step 312. The method 300 thus ensures that invalid voucher codes may not be used to obtain car wash services.

Figure 12:
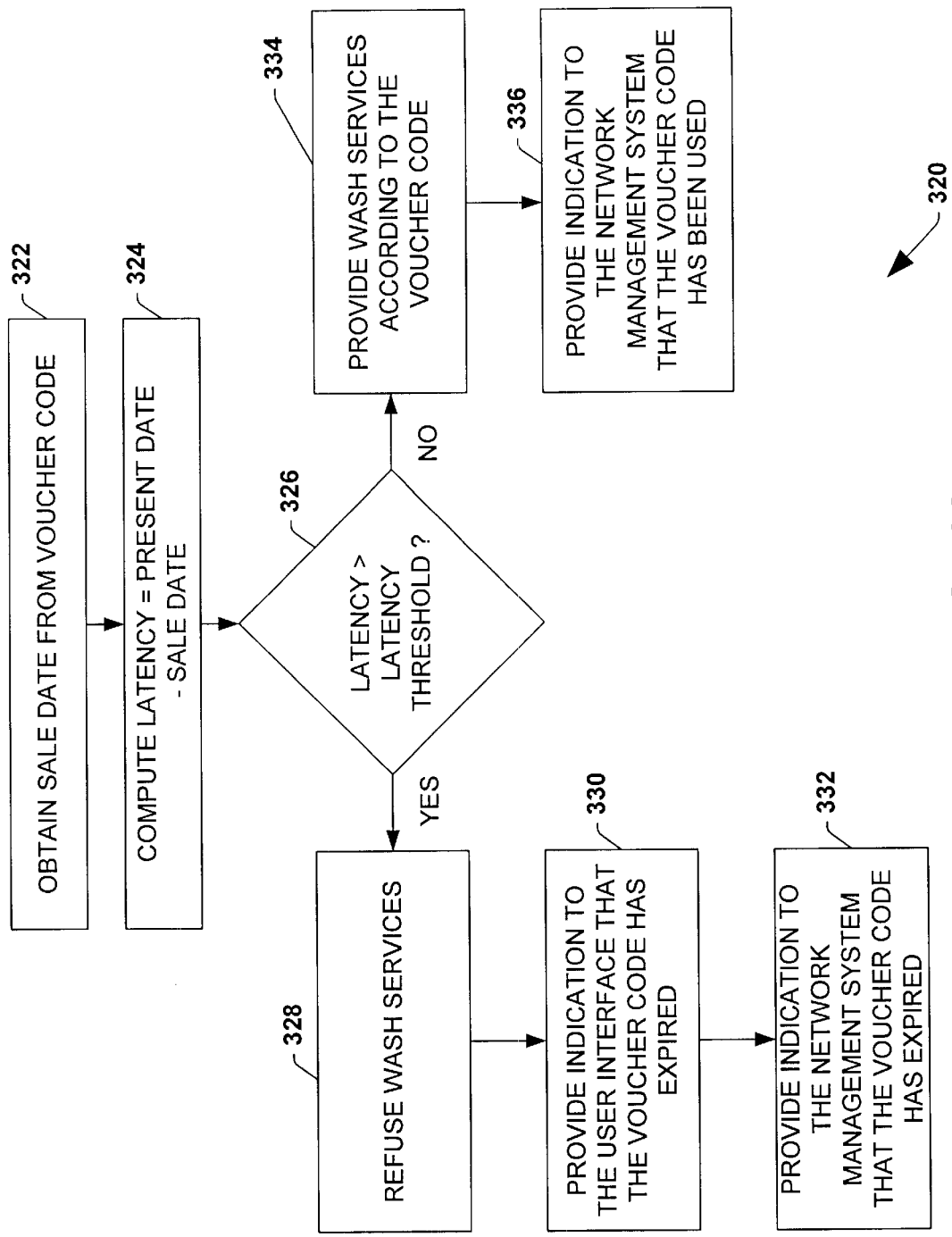
FIG. 12 is a flow diagram further illustrating an aspect of the validity determination of the method of FIG. 1.

Referring also to FIG. 12, further aspects of the validity determination of the method 300 are illustrated in a method 320. At step 322, sale date information is obtained from the voucher code, after which the latency of the voucher code is computed as the present date minus the sale date at step 324. Thereafter, decision step 326 determines whether the latency of the voucher code is greater than the latency threshold period. If so, car wash services are refused at step 328, an indication is provided to a user interface that the voucher code has expired at step 330, and the network management system is provided with an indication that the voucher code has expired at step 332. If the latency computed at step 324 was not found to be greater than the latency threshold at step 326, car wash services are provided to the customer according to the voucher code at step 334. Thereafter, an indication is provided to the network management system that the voucher code has been used at step 336. The method 320 allows discrimination between old voucher codes and recently issued voucher codes. It will be noted in this regard that information may be provided to the network management system regardless of the validity of the voucher code, thus allowing auditing of usage and attempted usage of both older and newer voucher codes.

Figure 13:
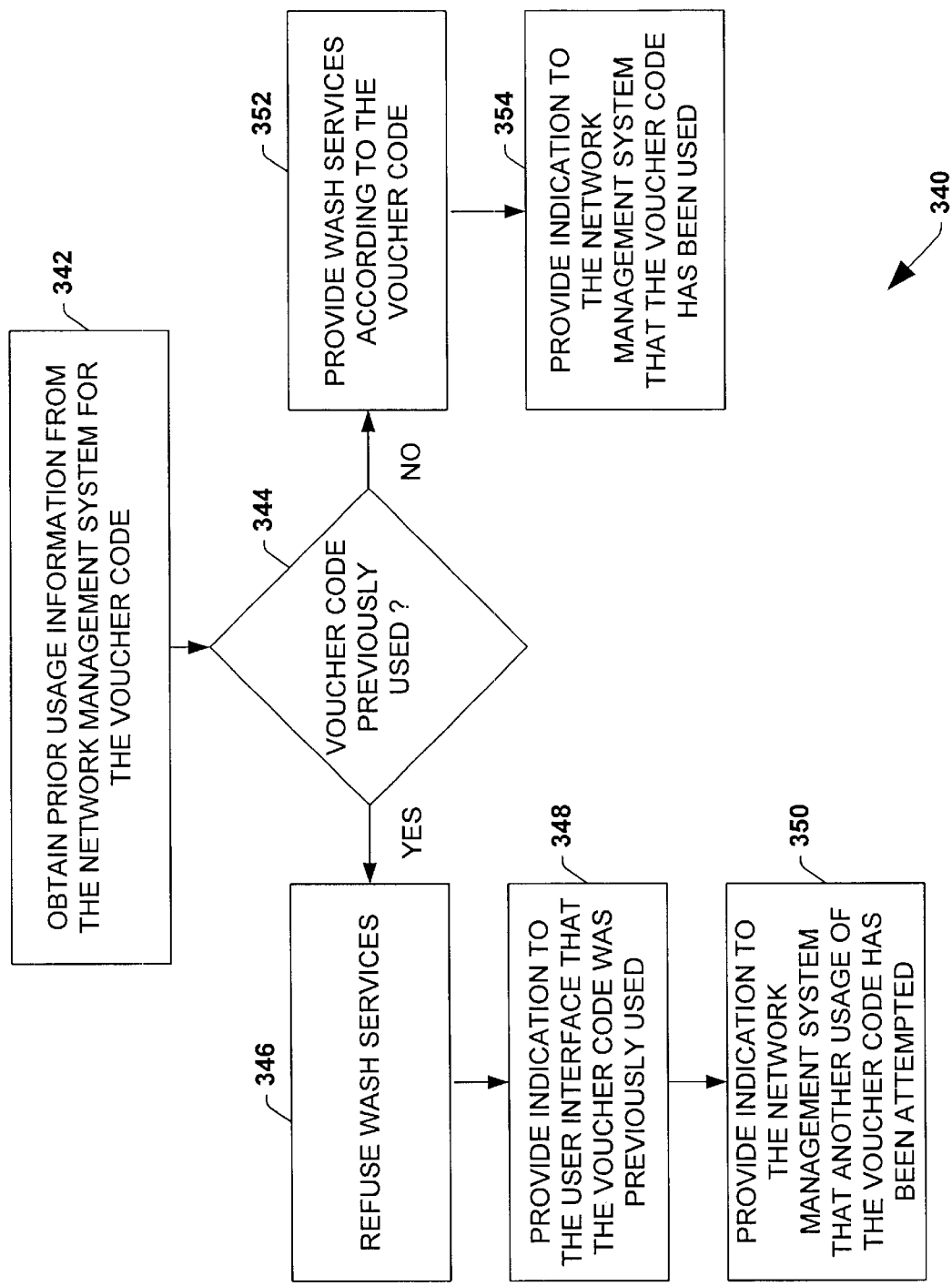
FIG. 13 is a flow diagram further illustrating another aspect of the validity determination of the method of FIG. 11.
Figure 1A:
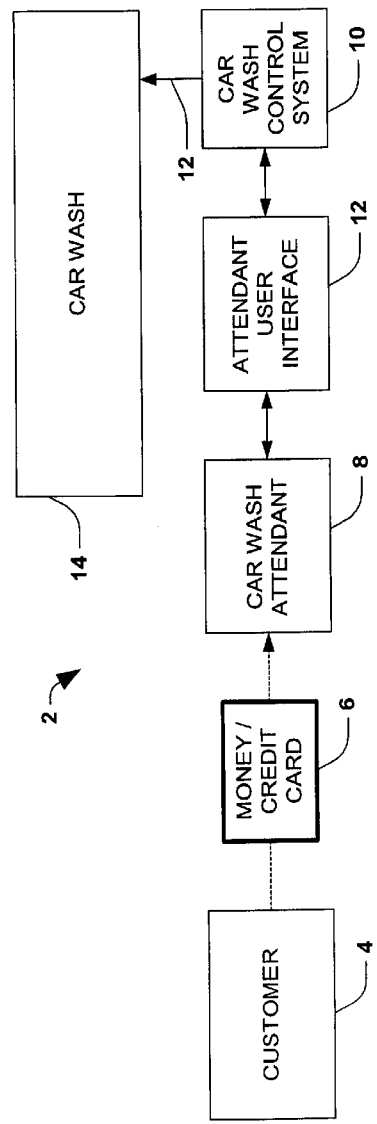

Referring also to FIG. 13, a method 340 is illustrated in accordance with another aspect of the validity determination of the method 300 of FIG. 11. At step 342, prior usage information is obtained from the network management system for the voucher code presented to the user interface. Based on this information, the system (e.g., system 58 of FIG. 4) determines whether the voucher code was previously used at step 344. If so, car wash services are refused at step 346, an indication is provide to the user interface that the voucher code was previously used at step 348, and an indication is provided to the network management system that another usage of the voucher code has been attempted at step 350. This method 340 enables tracking and auditing of attempted reuse of once valid voucher codes. If the voucher code was not previously used, car wash services are provided according to other information in the voucher code at step 352, after which an indication is provided to the network management system that the voucher code has been used at step 354.

Referring again to FIGS. 3A and 10A, it will be recognized that the database of the network management system 66 may be provided with a variety of information related to specific voucher codes by the site management systems 102, 104, 106, and 108. For example, each time a voucher code is presented at one of the site management systems, the network management system 66 may be provided with wash type service selection information T, optional service information E, site code information S representing the site at which the voucher was originally sold, sale date information M, D, and Y, as well as sequence code information Q. In addition, site management systems 102, 104, 106, and 108 may report their individual site codes, present date information to indicate when car wash services were requested through presentation of the voucher code, and information relating to any additional or upgrade wash services requested at that time by the customer. Attempts at reuse of previously used voucher codes, and use of old, expired, or invalid voucher codes may also be reported to the network management system 66 in accordance with the invention.

The accumulation of such information at the network management system 66 allows the creation and maintenance of a database thereat (e.g., database 122 of FIG. 5). Queries may be made of this database, and information may be obtained therefrom at the network management system location and/or at any one of the site management systems in a car wash chain. In addition, as illustrated and described above with respect to FIG. 3B, the individual site management systems may include local databases, wherein such voucher code related information is replicated from the network management system database. It will be further appreciated at this point that the methods illustrated and described may be practiced in systems other than those illustrated and described, and also that the systems illustrated and described herein may be employed in accordance with methods not illustrated or described herein.

Although the invention has been shown and described with respect to a certain aspects or applications, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention.

In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A method for processing a car wash voucher code in a multi-site car wash system, comprising:
   receiving the voucher code from a user interface;
   determining the validity of the voucher code;
   selectively providing at least one car wash service according to the validity of the voucher code; and
   sending information relating to the voucher code to a network management system having a database.

2. The method of claim 1, wherein the user interface comprises one of a keypad and a barcode reader, and wherein receiving the voucher code from the user interface comprises reading the code from the user interface.

3. The method of claim 1, wherein the voucher code comprises sale date information and wherein determining the validity of the voucher code comprises:
   determining a latency value for the voucher code based on the sale date information;
   comparing the latency value for the voucher code with a latency threshold;
   selectively expiring the voucher code and refusing car wash services if the latency value for the voucher code is greater than the latency threshold; and
   selectively providing at least one car wash service according to the voucher code if the latency value for the voucher code is less than or equal to the latency threshold.

4. The method of claim 3, wherein expiring the voucher code comprises providing an indication to the user interface that the voucher code has expired, and wherein sending information relating to the voucher code to a network management system comprises:
   providing an indication in the network management system database that the voucher code has expired if the latency value for the voucher code is greater than the latency threshold; and
   providing an indication in the network management system database that the voucher code has been used if the latency value for the voucher code is less than or equal to the latency threshold.

5. The method of claim 3, wherein determining the validity of the voucher code further comprises:
   obtaining information from the network management system database related to the voucher code;
   determining whether the voucher code has been previously used according to the information from the network management system database related to the voucher code;
   selectively invalidating the voucher code and refusing car wash services if the voucher code has been previously used; and
   selectively providing at least one car wash service according to the voucher code if the latency value for the voucher code is less than or equal to the latency threshold and the voucher code has not been previously used.

6. The method of claim 5, wherein invalidating the voucher code comprises providing an indication to the user interface that the voucher code has been previously used, and wherein sending information relating to the voucher code to a network management system comprises:
   providing an indication in the network management system database that another usage of the voucher code has been attempted if the voucher code has been previously used; and
   providing an indication in the network management system database that the voucher code has been used if the latency value for the voucher code is less than or equal to the latency threshold and the voucher code has not been previously used.

7. The method of claim 5, wherein obtaining information from the network management system database comprises receiving a message from the network management system via one of E-mail and a continuous connection.

8. The method of claim 7, wherein a message from the network management system includes a replication packet.

9. The method of claim 1, wherein determining the validity of the voucher code comprises:
   obtaining information from the network management system database related to the voucher code;
   determining whether the voucher code has been previously used according to the information from the network management system database related to the voucher code;
   selectively invalidating the voucher code and refusing car wash services if the voucher code has been previously used; and
   selectively providing at least one car wash service according to the voucher code if the voucher code has not been previously used.

10. The method of claim 9, wherein invalidating the voucher code comprises providing an indication to the user interface that the voucher code has been previously used, and wherein sending information relating to the voucher code to a network management system comprises:
   providing an indication in the network management system database that another usage of the voucher code has been attempted if the voucher code has been previously used; and
   providing an indication in the network management system database that the voucher code has been used if the voucher code has not been previously used.

11. The method of claim 1, wherein the voucher code further comprises information related to at least one desired car wash service, further comprising:
   receiving information from the user interface relating to at least one additional car wash service;
   selectively providing the at least one desired car wash service based on the voucher code according to the validity of the voucher code; and
   selectively providing the at least one additional car wash service according to the information from the user interface relating to at least one additional car wash service.

12. The method of claim 1, wherein the voucher code further comprises information related to at least one desired car wash service, wherein selectively providing at least one car wash service comprises providing the information related to the at least one desired car wash service to a car wash control system.

13. The method of claim 1, wherein sending information relating to the voucher code to a network management system comprises providing an indication in the network management system database that the voucher code has been used.

14. The method of claim 1, wherein the voucher code is encrypted, further comprising decrypting the voucher code according to a decryption code.

15. The method of claim 1, wherein sending information relating to the voucher code to the network management system comprises sending a replication packet to the network management system.

16. The method of claim 1, wherein sending information relating to the voucher code to the network management system comprises sending a message to the network management system via one of a continuous connection and E-mail using an ISP with store and forward capability.

17. A method of auditing car wash voucher code usage in a car wash system having a database including information relating to voucher code usage, a user interface, and a manager interface, the method comprising:

receiving a database query from the management interface;

obtaining a result set from the database according to the database query; and selectively providing a report relating to voucher code usage to the management interface according to the result set.

18. The method of claim 17, further comprising:

receiving a voucher code from the user interface, wherein the voucher code includes sale date information;

providing an indication in the database that the voucher code has been presented to the system;

determining a latency value for the voucher code according to the sale date information;

selectively providing an indication in the database that the voucher code has expired if the latency value for the voucher code exceeds a latency threshold;

determining whether the voucher code has been previously used; and selectively providing an indication in the database that another usage of the voucher code has been attempted if the voucher code has been previously used;

whereby a report may be obtained indicating latency, expiration, and validity information associated with at least one voucher code.

19. The method of claim 18, wherein the car wash system includes a plurality of car wash sites, wherein each car wash site has a site code associated therewith, and wherein the voucher code includes a sale site code; further comprising:

obtaining the sale site code from the voucher code;

providing an indication in the database of the sale site code associated with the voucher code;

providing an indication in the database of a site code associated with the site at which the voucher code was presented; and providing an indication in the database of the date on which the voucher code was presented;

whereby a report may be obtained indicating the sale site code, presentation site code, sale date, and presentation date information associated with at least one voucher code.

20. The method of claim 19, wherein the voucher code further comprises information related to at least one desired car wash service, further comprising:

providing an indication in the database of the at least one desired car wash service associated with the voucher code;

whereby a report may be obtained indicating the desired car wash services associated with at least one voucher code.

21. The method of claim 20, further comprising:

selectively providing an indication in the database of at least one additional car wash service provided in association with the at least one voucher code;

whereby a report may be obtained indicating the desired car wash services and any additional car wash services provided in association with at least one voucher code.

22. The method of claim 17, wherein the car wash system includes a plurality of car wash sites, wherein each car wash site has a site code associated therewith, and wherein the voucher code includes a sale site code; further comprising:

obtaining the sale site code from the voucher code;

providing an indication in the database of the sale site code associated with the voucher code;

providing an indication in the database of a site code associated with the site at which the voucher code was presented; and providing an indication in the database of the date on which the voucher code was presented;

whereby a report may be obtained indicating the sale site code, presentation site code, sale date, and presentation date information associated with at least one voucher code.

23. The method of claim 17, wherein the voucher code further comprises information related to at least one desired car wash service, further comprising:

providing an indication in the database of the at least one desired car wash service associated with the voucher code;

whereby a report may be obtained indicating the desired car wash services associated with at least one voucher code.

24. A car wash management system comprising:

a site management server including a communications interface operative to communicate with a network management system;

a user interface adapted to receive a voucher code from one of a customer and an attendant, and operative to send the voucher code to the site management server; and a car wash control system adapted to receive car wash service information from the site management server and to provide control signals to a car wash;

wherein the site management server is operative to receive the voucher code from the user interface, to determine the validity of the voucher code, to selectively provide car wash service information to the car wash control system according to the validity of the voucher code, and to provide information relating to the voucher code to the network management system.

25. The system of claim 24, wherein the voucher code includes sale date information, and wherein the site management server is adapted to determine a latency value for the voucher code based on the sale date information, to selectively refuse car wash services if the latency value is greater than a latency threshold, and to send an indication to the network management system that the voucher has expired.

26. The system of claim 25, wherein the site management server is adapted to obtain prior use information associated with the voucher code from the network management system, to selectively refuse car wash services if the voucher code has previously been used, and to send an indication to the network management system that another usage of the voucher code has been attempted.

27. The system of claim 26, wherein the user interface includes one of a barcode reader adapted to read the voucher code from a voucher, and a numeric keypad adapted to receive the voucher code from an operator.

28. The system of claim 24, wherein the site management server is adapted to obtain prior use information associated with the voucher code from the network management system, to selectively refuse car wash services if the voucher code has previously been used, and to send an indication to the network management system that another usage of the voucher code has been attempted.

29. The system of claim 24, wherein the network management system comprises a network management system database, the system further comprising a manager interface operatively connected to the site management server and adapted to obtain information via the site management server from the network management system database relating to a voucher code, and to present the voucher code information to a user, whereby the user may generate a query of the network management database according to voucher related information, and receive a report of voucher related information.

30. The system of claim 24, wherein the site management server communications interface is operative to communicate with the network management system via one of WAN based file transfers, E-mail, FTP, and Internet pipes.

31. The system of claim 24, wherein the network management system comprises information related to unused voucher codes.

32. The system of claim 24, wherein the network management system comprises a network database including information relating to at least one voucher code, wherein the site management server further comprises a local database, and wherein the site management server is further operative to send and receive replication packets from the network management system, whereby the local database comprises the information relating to the at least one voucher code.

33. A computer-readable medium having computer-executable instructions for performing steps comprising:

receiving a voucher code from a user interface;

determining the validity of the voucher code;

selectively providing at least one car wash service via a car wash control system according to the validity of the voucher code; and sending information relating to the voucher code to a network management system having a database.

* * * * *

UNITED STATES PATENT AND TRADEMARK OFFICE
CERTIFICATE OF CORRECTION

PATENT NO.   : 6,402,030 B1
DATED        : June 11, 2002
INVENTOR(S)  : Steven E. Summers and Rondall P. James, Jr.

It is certified that error appears in the above-identified patent and that said Letters Patent is hereby corrected as shown below:

<u>Title page,</u>
Item [*] Notice, please replace "Notice" as follows

-- [*]   Notice: Subject to any disclaimer, the term of this
           patent is extended or adjusted under 35
           U.S.C. 154(b) by 79 days. --

<u>Drawings,</u>
Please replace "Sheet 1 of 19" with a new -- Sheet 1 of 19 -- attached.

<u>Column 11,</u>
Line 17, please replace the numeral "18" with the numeral -- 118 --.

Signed and Sealed this

Seventeenth Day of December, 2002

JAMES E. ROGAN
*Director of the United States Patent and Trademark Office*